US012069753B2

(12) United States Patent
Zhao

(10) Patent No.: US 12,069,753 B2
(45) Date of Patent: Aug. 20, 2024

(54) DATA TRANSMISSION METHOD FOR SIDELINK COMMUNICATION, DEVICE, AND SYSTEM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 562 days.

(21) Appl. No.: 17/280,517

(22) PCT Filed: Sep. 28, 2018

(86) PCT No.: PCT/CN2018/108487
§ 371 (c)(1),
(2) Date: Mar. 26, 2021

(87) PCT Pub. No.: WO2020/062101
PCT Pub. Date: Apr. 2, 2020

(65) Prior Publication Data
US 2021/0345430 A1    Nov. 4, 2021

(51) Int. Cl.
*H04W 76/14* (2018.01)
*H04L 5/00* (2006.01)
(Continued)

(52) U.S. Cl.
CPC ........... *H04W 76/14* (2018.02); *H04L 5/0005* (2013.01); *H04W 4/021* (2013.01); *H04W 4/46* (2018.02)

(58) Field of Classification Search
CPC ..... H04W 76/14; H04W 76/40; H04W 4/021; H04W 4/46; H04W 4/40; H04W 4/44; H04L 5/0005; H04L 5/0069
See application file for complete search history.

(56) References Cited

U.S. PATENT DOCUMENTS 8,520,695 B1    8/2013   Rubin et al.
8,860,564 B2 *  10/2014  Rubin ................... G01C 21/26
                                                340/436
(Continued)

FOREIGN PATENT DOCUMENTS

CN      105187529 A    12/2015
CN      106413019 A     2/2017
(Continued)

OTHER PUBLICATIONS

International Search Report issued on Jul. 3, 2019 in PCT/CN2018/108487 filed on Sep. 28, 2018, citing reference AO therein, 2 pages.
(Continued)

*Primary Examiner* — Jamal Javaid
(74) *Attorney, Agent, or Firm* — Oblon, McClelland, Maier & Neustadt, L.L.P.

(57) ABSTRACT

The present disclosure relates to the field of communications and provides a data transmission method for sidelink communication and a device. The method can include a first Internet-of-vehicle device that determines a destination reception geographical location of a user data packet and generates a MAC PDU corresponding to the user data packet. The MAC PDU can carry the destination reception geographical location. The first Internet-of-vehicle device encodes and modulates the MAC PDU to obtain physical layer data, and sends the physical layer data on a target time-frequency resource. A second Internet-of-vehicle device compares the destination reception geographical location carried by the MAC PDU to determine whether to receive the user data packet.

22 Claims, 9 Drawing Sheets

(51) Int. Cl.
*H04W 4/021* (2018.01)
*H04W 4/46* (2018.01)

(56) References Cited

U.S. PATENT DOCUMENTS

| | | |
|---|---|---|
| 2013/0278440 A1 | 10/2013 | Rubin et al. |
| 2013/0278441 A1 | 10/2013 | Rubin et al. |
| 2013/0278442 A1 | 10/2013 | Rubin et al. |
| 2013/0278443 A1 | 10/2013 | Rubin et al. |
| 2013/0279695 A1 | 10/2013 | Rubin et al. |
| 2013/0281140 A1 | 10/2013 | Rubin et al. |
| 2013/0281141 A1 | 10/2013 | Rubin et al. |
| 2013/0282267 A1 | 10/2013 | Rubin et al. |
| 2013/0282271 A1 | 10/2013 | Rubin et al. |
| 2013/0282277 A1 | 10/2013 | Rubin et al. |
| 2013/0282357 A1 | 10/2013 | Rubin et al. |
| 2013/0293394 A1 | 11/2013 | Rubin et al. |
| 2015/0073702 A1* | 3/2015 | Jouaux ............... G08G 1/0141 701/519 |
| 2015/0077270 A1 | 3/2015 | Rubin et al. |
| 2015/0081201 A1 | 3/2015 | Rubin et al. |
| 2015/0131637 A1 | 5/2015 | Rubin et al. |
| 2015/0146605 A1 | 5/2015 | Rubin et al. |
| 2018/0124186 A1 | 5/2018 | Zanier et al. |
| 2018/0270624 A1 | 9/2018 | Lee et al. |
| 2019/0190662 A1 | 6/2019 | Lee et al. |

FOREIGN PATENT DOCUMENTS

| | | |
|---|---|---|
| CN | 107276902 A | 10/2017 |
| WO | WO 2017/196085 A2 | 11/2017 |

OTHER PUBLICATIONS

Indian Office Action issued Feb. 4, 2022 in Indian Patent Application No. 202147015654, citing documents AV and AW therein, 6 pages.

Extended European Search Report issued Apr. 4, 2022 in European Patent Application No. 18934881.6, citing documents AA-AU and AX therein, 10 pages.

\* cited by examiner

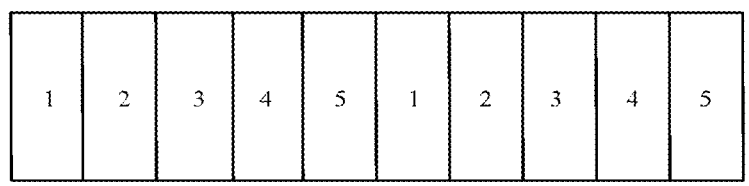
Fig. 3
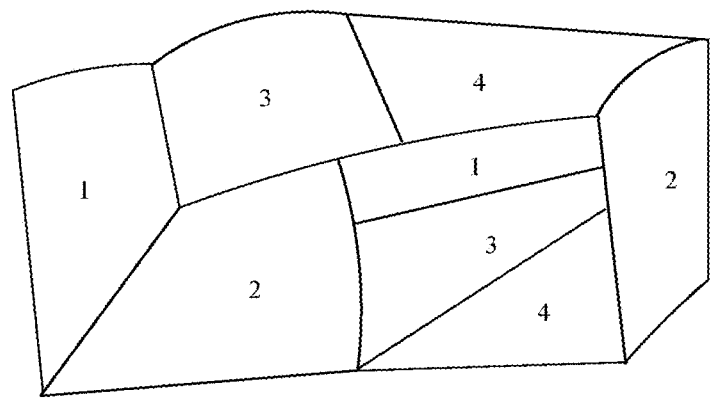
Fig. 4
Fig. 5
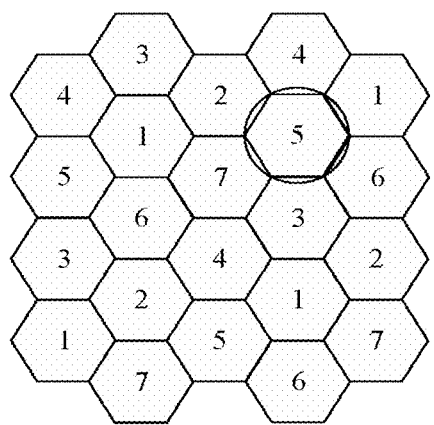
Fig. 6

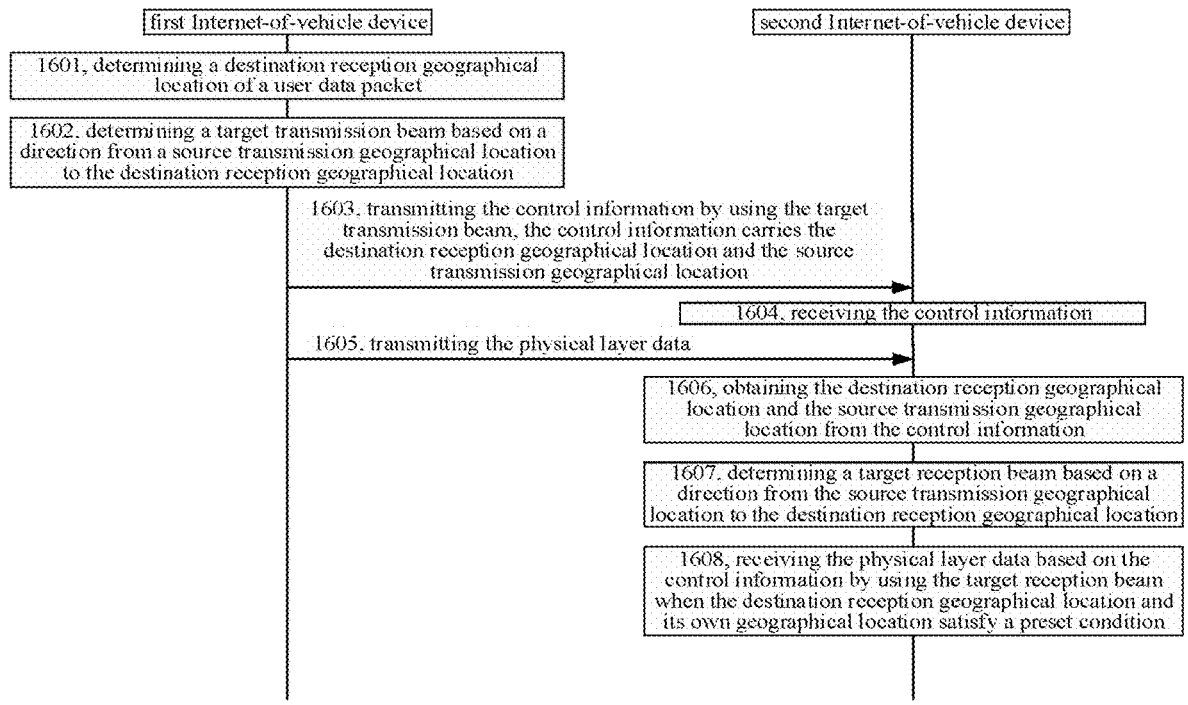
Fig. 16
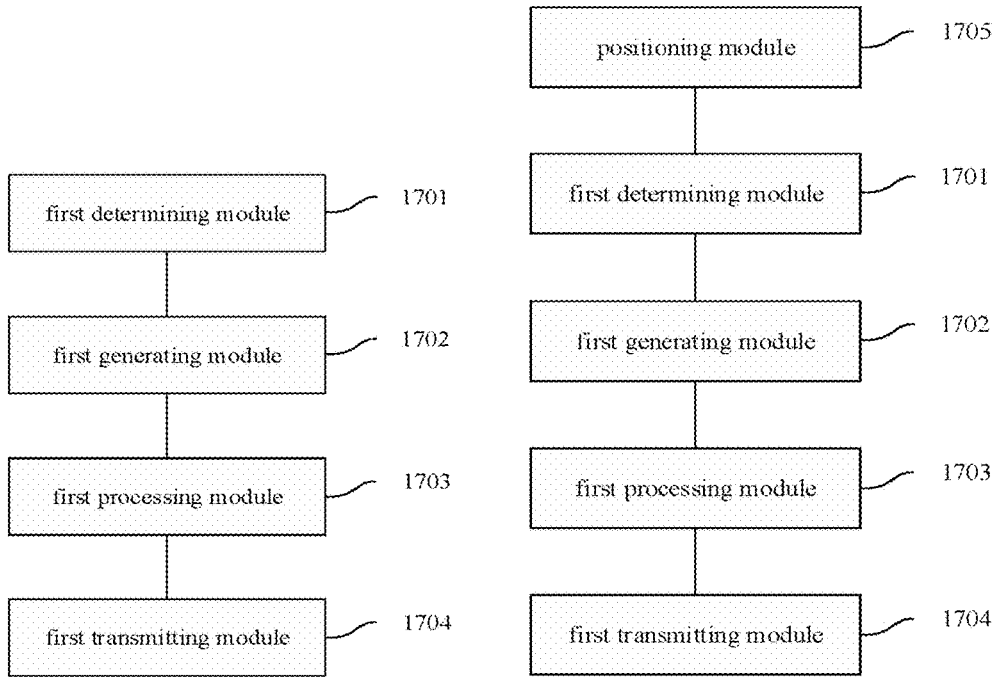
Fig. 17                    Fig. 18

DATA TRANSMISSION METHOD FOR SIDELINK COMMUNICATION, DEVICE, AND SYSTEM

CROSS-REFERENCE TO RELATED APPLICATION

This application is a U.S. national phase of International Application No. PCT/CN2018/108487, filed on Sep. 28, 2018, the entire content of which is incorporated herein by reference.

TECHNICAL FIELD

The present disclosure relates to a field of communications, including to a data transmission method for sidelink communication, a device, and a system.

BACKGROUND

With the continuous development of autonomous driving technology, in order to support the application of Internet of vehicle, also called vehicle to everything (V2X), people have ever increasing requirements for V2X technology. Cellular-based V2X (C-V2X), which is formed based on the evolution of cellular network communication technologies, such as 3G/4G/5G, is suitable for communication between vehicle-mounted equipment and user equipment located around the geographic location of the vehicle.

In a multicast transmission-and-reception scenario between two Internet-of-vehicle devices, a transmission device sends data packets and control information at a physical layer. The control information is sent prior to physical layer data or sent at the same time with the physical layer data. The control information includes related information for receiving the physical layer data. The reception device monitors the control information through blind detection, and receives the physical layer data corresponding to the control information. For the data packet sent by the transmission device, a media access control packet data unit (MAC PDU) of the data packet includes a source MAC (media access control) address and a target MAC address. After receiving the data packet, the reception device judges whether the data packet is the data transmitted to the reception device according to whether the target MAC address in the MAC layer of the data packet is a multicast address corresponding to the reception device.

The above method requires the transmission device and the reception device to pre-establish a multicast group and determine the multicast address to achieve multicast communication. However, the process of establishing the multicast group may increase the communication delay, which is not conducive to satisfying the low-latency requirements of the V2X communication scenario.

SUMMARY

According to a first aspect of the disclosure, there is provided a data transmission method for sidelink communication. The method can include determining, by a first Internet-of-vehicle device, a destination reception geographical location of a user data packet; generating, by the first Internet-of-vehicle device, a MAC PDU (media access control packet data unit) corresponding to the user data packet, in which the MAC PDU carries the destination reception geographical location. The method can further include encoding and modulating the MAC PDU by the first Internet-of-vehicle device, to obtain physical layer data; and transmitting, by the first Internet-of-vehicle device, the physical layer data on target time-frequency resource.

According to another aspect of the disclosure, there is provided a data transmission method for sidelink communication. The method can include receiving, by a second Internet-of-vehicle device, physical layer data on target time-frequency resource; decoding and demodulating the physical layer data by the second Internet-of-vehicle device, to obtain a MAC PDU. The method can further include obtaining, by the second Internet-of-vehicle device, a destination reception geographical location from the MAC PDU, and transferring, by the second Internet-of-vehicle device, a user data packet in the MAC PDU to an application layer for processing in response to the destination reception geographical location and a geographical location of the second Internet-of-vehicle device satisfying a preset condition.

According to an aspect of the disclosure, there is provided a data transmission method for sidelink communication. The method can include determining, by a first Internet-of-vehicle device, a destination reception geographical location of a user data packet; transmitting, by a first Internet-of-vehicle device, control information to a second Internet-of-vehicle device, in which the control information is configured to indicate reception related information of physical layer data, and the control information carries the destination reception geographical location, and transmitting the physical layer data by the first Internet-of-vehicle device.

According to another aspect of the disclosure, there is provided a data transmission method for sidelink communication. The method can include receiving, by a second Internet-of-vehicle device, control information sent by a first Internet-of-vehicle device, in which the control information is configured to indicate reception related information of physical layer data. The method can further include obtaining, by the second Internet-of-vehicle device, a destination reception geographical location from the control information; and receiving, by the second Internet-of-vehicle device, the physical layer data based on the control information in response to the destination reception geographical location and a geographical location of the second Internet-of-vehicle device satisfying a preset condition.

According to another aspect of the disclosure, there is provided an Internet-of-vehicle device. The device can include a processor, a transceiver connected to the processor, and a memory configured to store instructions executable by the processor. The processor is configured to load and execute the instructions to perform the data transmission method for sidelink communication according to any one of the above embodiments.

According to another aspect of the disclosure, there is provided a non-transitory computer-readable storage medium having stored therein at least one instruction, at least one program, a code set or an instruction set. The at least one instruction, the at least one program, the code set or the instruction set is loaded and executed by a processor to perform the data transmission method for sidelink communication according to any one of the above embodiments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the invention.

FIG. 3 is a schematic diagram illustrating a sub-region division method for the Earth's surface according to an exemplary embodiment.

FIG. 4 is a schematic diagram illustrating a sub-region division method for a road according to an exemplary embodiment.

FIG. 5 is a schematic diagram illustrating an administrative sub-region division method according to an exemplary embodiment.

FIG. 6 is a schematic diagram illustrating a division method of sub regions according to an exemplary embodiment.

FIG. 16 is a flow chart illustrating a data transmission method for sidelink communication according to an exemplary embodiment.

FIG. 17 is a block diagram illustrating a data transmission apparatus for sidelink communication according to an exemplary embodiment.

FIG. 18 is a block diagram illustrating a data transmission apparatus for sidelink communication according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the present disclosure as recited in the appended claims.

Figure 1:
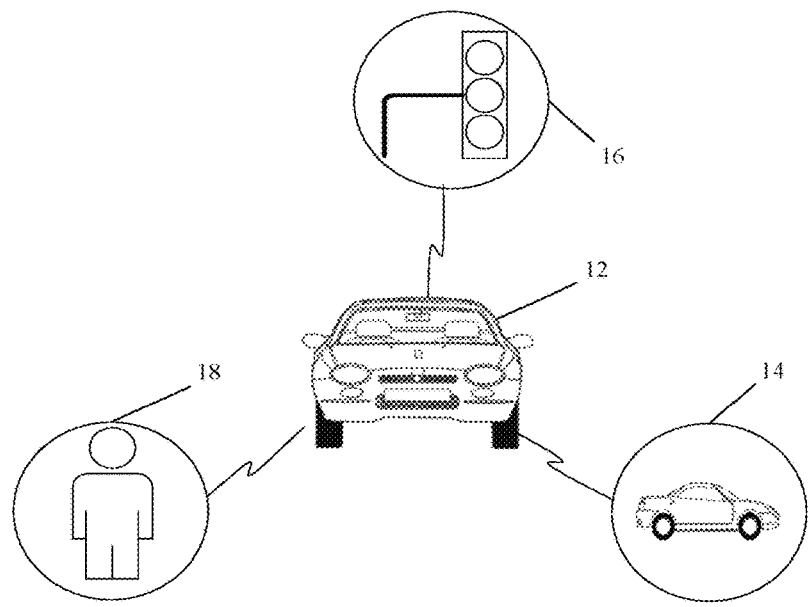
FIG. 1 is a schematic diagram illustrating a data transmission system for sidelink communication according to an exemplary embodiment.

FIG. 1 is a schematic diagram illustrating a data transmission system for sidelink communication provided in an exemplary embodiment of the present disclosure. The system includes a vehicle 12, other vehicles 14, an infrastructure 16 and a pedestrian 18.

Vehicle to vehicle (V2V) refers to communication between the vehicle 12 and other vehicles 14. A vehicle sends its own related information to other vehicles. The related information includes driving speed, a geographic location, a driving direction and driving status.

Vehicle to infrastructure (V2I) refers to communication between the vehicle 12 and the infrastructure 16. The infrastructure 16 includes all infrastructures encountered during the driving of the vehicle, including building facilities such as traffic lights, bus stations, buildings, and tunnels.

Vehicle to pedestrian (V2P) refers to communication between the vehicle 12 and the pedestrian 18. The pedestrian 18 generally refers to an electronic device with a mobile communication capability carried by a pedestrian, such as a mobile phone and a wearable device. The wearable device may include a smart bracelet, a smart watch, and a smart ring.

In an embodiment of the present disclosure, for example, the vehicle 12 may be called as a first Internet-of-vehicle device, also called as a transmission device, and other vehicles 14, the infrastructure 16 and the pedestrian 18 may be called a second Internet-of-vehicle device, also called a reception device. However, the roles of the two may be interchanged, which is not limited.

Figure 2:
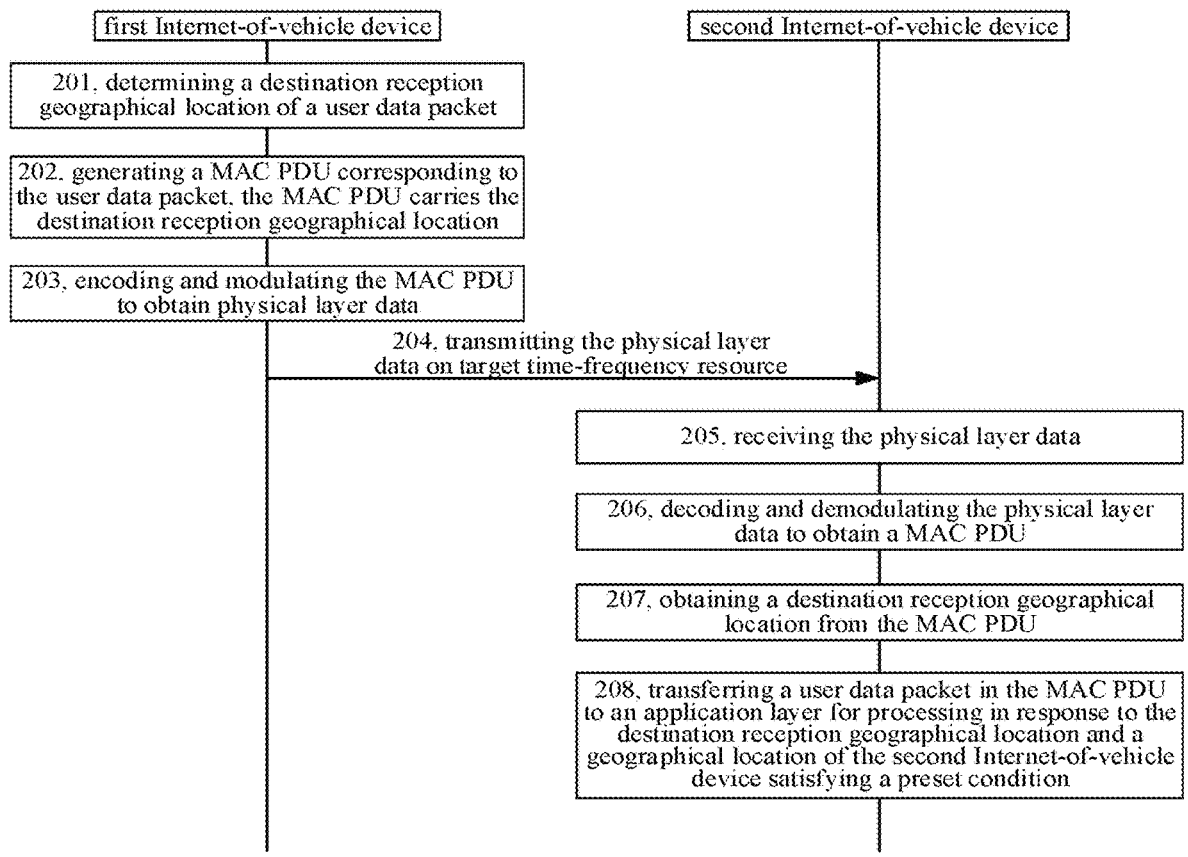
FIG. 2 is a flow chart illustrating a data transmission method for sidelink communication according to an exemplary embodiment.

FIG. 2 is a flow chart illustrating a data transmission method for sidelink communication provided in an exemplary embodiment of the present disclosure. For example, as illustrated in FIG. 2, the method may be applied to the data transmission system for sidelink communication as illustrated in FIG. 1. The method includes the followings.

At step 201, a first Internet-of-vehicle device determines a destination reception geographical location of a user data packet. The user data packet is an Internet protocol (IP) data packet that the first Internet-of-vehicle device needs to send individually or in groups to a second Internet-of-vehicle device. The user data packet is generated by an application layer of the first Internet-of-vehicle device. For example, the first Internet-of-vehicle device generates the IP data packet for informing nearby vehicles of driving status of the first Internet-of-vehicle device when accelerating, braking, steering, changing lanes or malfunctioning.

The destination reception geographical location is used to indicate a reception range of the user data packet by using a geographical location. The destination reception geographical location may be one geographical point, multiple points, one geographical region, or multiple geographical regions.

The first Internet-of-vehicle device includes a global navigation satellite system (GNSS). The first Internet-of-vehicle device determines the destination reception geographical location of the user data packet by using the GNSS. The GNSS includes America's Global Positioning System (GPS), China's Beidou system, Russia's Global navigation satellite system (GLONASS) system, or the European Union's Galileo system, which is not limited in the disclosure.

In some embodiments, the destination reception geographical location is represented by a sub-region identifier. Alternatively, the sub-region identifier can be configured to identify a first sub region obtained by dividing the Earth's surface, and the first sub region is obtained by using a grid division method or a hexagonal division method. In some embodiments, sub-region identifiers corresponding to at least two sub regions may be the same, and a distance between the at least two sub regions with the same sub-region identifier is greater than a threshold. In some embodiments, each sub region corresponds to a unique sub-region identifier.

FIG. 3 illustrates a sub-region division method for the Earth's surface provided in an exemplary embodiment. Grid division is used to obtain multiple sub regions in this sub-region division method. Any two sub regions are disjoint, and each sub region has the same shape and is a rectangle. Each rectangle corresponds to its own sub-region identifier. The sub-region identifier may be represented by a number or other characters. For example, a sub region identified by number 1 may be called a sub region 1. The destination reception geographical location may be represented by any sub region and a number corresponding to the sub region. There are four sub regions identified with a sub-region identifier 1 in FIG. 3. A distance between any two sub regions identified with the sub-region identifier 1 is greater than a first threshold. For example, the first threshold is a side length of 4 grids.

Alternatively, the sub-region identifier is configured to identify a second sub region obtained by dividing a road. The second sub region is obtained by using a road section division method and/or a lane division method. In some embodiments, sub-region identifiers corresponding to at least two sub regions may be the same, and a distance between the at least two sub regions with the same sub-region identifier is greater than a threshold.

FIG. 4 illustrates a sub-region division method for a road provided in an exemplary embodiment. Road-section division is used to obtain multiple sub regions in this sub-region division method. Any two sub regions are disjoint, and each sub region has the same shape and each road section has the same length. Each road section corresponds to its own sub-region identifier. The sub-region identifier may be represented by a number. For example, a sub region identified by number 3 may be called a sub region 3. There are two sub regions identified with a sub-region identifier 3 in FIG. 4. A distance between the two sub regions 3 is greater than a second threshold 4. The second threshold refers to a length of four road sections.

Alternatively, the sub-region identifier is configured to identify a third sub region obtained by administrative division. The third sub region is obtained by using a country division method, a city division method, or a minimum administrative jurisdiction division method. In some embodiments, sub-region identifiers corresponding to at least two sub regions may be the same, and a distance between the at least two sub regions with the same sub-region identifier is greater than a threshold.

FIG. 5 illustrates an administrative sub-region division method provided in an exemplary embodiment. Any two sub regions are disjoint, and each sub region has the same shape. Each administrative region corresponds to its own sub-region identifier. The sub-region identifier may be represented by a number. For example, a sub region identified by number 2 may be called a sub region 2. There are two sub regions identified with a sub-region identifier 4 in FIG. 5. A distance between the two sub regions 4 is greater than a third threshold 1. The third threshold 1 means that the number of administrative regions between two administrative regions is at least one. This embodiment does not limit the shape and the identification method of the sub region, and the thresholds.

In some other embodiments, the destination reception geographical location can be represented by a sub-region identifier and a coverage radius.

FIG. 6 illustrates a division method of sub regions provided in an exemplary embodiment. FIG. 6 includes multiple sub regions, and each sub region has the same shape and is a regular hexagon. Each regular hexagonal sub region corresponds to its own sub-region identifier. The sub-region identifier may be represented by a number and a coverage radius r. A circle is formed based on the coverage radius r, and the center of the circle is a center point of the regular hexagon. Alternatively, the center of the circle may be any point of the sub region. For example, a sub region is identified by number 5, and the sub region may be called sub region 5. When the coverage radius is r, the destination reception geographical location may be represented as a sub region 5-r, or (5, r).

At step 202, the first Internet-of-vehicle device generates a media access control packet data unit (MAC PDU) corresponding to the user data packet. The MAC PDU carries the destination reception geographical location.

Figure 7:
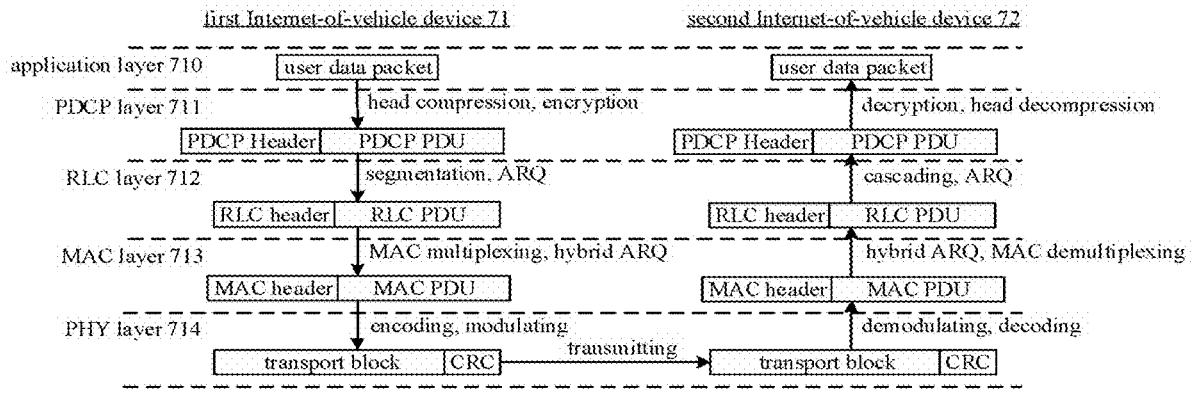
FIG. 7 is a schematic diagram illustrating a transmission process of a user data packet according to an exemplary embodiment.

FIG. 7 illustrates a transmission process of a user data packet. A transport protocol layer of the first Internet-of-vehicle device 71 includes an application layer 710, a packet data convergence protocol (PDCP) layer 711, a radio link control (RLC) layer 712, a media access control (MAC) layer 713, and a physical (PHY) layer 714 arranged from top to bottom.

The user data packet is transferred from the application layer 710 to the PDCP layer 711 after the application layer 710 generates the user data packet. The PDCP layer 711 compresses and encrypts a header of the user data packet to form a packet data convergence protocol packet data unit (PDCP PDU) with a PDCP header. Then, the PDCP PDU is delivered to the RLC layer 712. The RLC layer 712 performs segmentation of PDCP PDU and related processing of an automatic repeat-request (ARQ) to form a radio link control packet data unit (RLC PDU) with an RLC header. The RLC header is used for sequential transmission of the first Internet-of-vehicle device 71 and RLC PDU authentication in the case of retransmission. Then, the RLC PDU is transferred to the MAC layer 713.

The MAC layer 713 multiplexes a large number of RLC PDUs and related processing of hybrid ARQ to form a MAC PDU with a MAC header. Each MAC header contains one or more MAC PDU sub header. Each sub header corresponds to one media access control service data unit (MAC SDU) or one MAC control unit or padding. There is a MAC PDU sub header that carries the destination reception geographical location.

In some embodiments, there are a source address information field and a destination address information field in an original information field of a MAC PDU. The source address information field is configured to carry a MAC address of a source device, also called a transmission device. The destination address information field is configured to carry a MAC address of a destination device, also called a reception device. However, in the disclosure, the MAC address of the source device and the MAC address of the destination device may not need to be carried. Therefore, in the disclosure, the destination reception geographical location may be carried in the destination address information field of the MAC PDU.

In some embodiments, the destination reception geographical location is within a newly added information field of the MAC PDU. The newly added information field of the MAC PDU refers to a separate information field set in the MAC PDU. Further, the destination reception geographical location is within a reserved information field of the MAC PDU. The reserved information field refers to a blank information field reserved in the MAC PDU.

At step 203, the first Internet-of-vehicle device encodes and modulates the MAC PDU to obtain physical layer data. The PHY layer 714 receives the MAC PDU transmitted by the MAC layer 713, and encodes and modulates the MAC PDU to obtain the physical layer data. The physical layer data may also be called a transport block. Alternatively, the PHY layer 714 may further add cyclic redundancy check (CRC) to the transport block for error detection at a reception end.

At step 204, the first Internet-of-vehicle device transmits the physical layer data on a target time-frequency resource. The first Internet-of-vehicle device carries the physical layer data on the target time-frequency resource of a physical channel, and transmits the physical layer data to a second Internet-of-vehicle device. Alternatively, the first Internet-of-vehicle device may transmit control information to the second Internet-of-vehicle device before the physical layer data is transmitted or at the same time as the physical layer data is transmitted. The control information is configured to indicate reception related information of the physical layer data.

Alternatively, the reception related information includes a time-domain position and/or a frequency-domain position of the target time-frequency resource for carrying the physical layer data. In some embodiments, the reception related information further includes information such as a modulation and coding scheme (MCS) of the physical layer data, a hybrid ARQ process number (HARQ-ID), a new-data indicator (NDI), and the like.

At step 205, the second Internet-of-vehicle device receives the physical layer data on the target time-frequency resource. The second Internet-of-vehicle device receives the physical layer data carried on the target time-frequency resource corresponding to the physical data channel. The time-domain position and/or the frequency-domain position of the target time-frequency resource is indicated by the control information.

Alternatively, the second Internet-of-vehicle device receives the control information transmitted by the first Internet-of-vehicle device. The control information is transmitted before the physical layer data is transmitted or at the same time as the physical layer data is transmitted by the first Internet-of-vehicle device. And then, the second Internet-of-vehicle device obtains the reception related information of the physical layer data from the control information, and receives the physical layer data on the target time-frequency resource based on the reception related information.

At step 206, the second Internet-of-vehicle device demodulates and decodes the physical layer data, to obtain the MAC PDU.

As illustrated in FIG. 7, a transport protocol layer of the second Internet-of-vehicle device 72 includes a PHY layer 714, a MAC layer 713, a RLC layer 712, a PDCP layer 711, and an application layer 710 arranged from bottom to top.

The PHY layer 714 of the second Internet-of-vehicle device 72 receives the physical layer data, and demodulates and decodes the physical layer data to obtain the MAC PDU. The PHY layer 714 transfers the MAC PDU to the MAC layer 713.

At step 207, the second Internet-of-vehicle device obtains the destination reception geographical location from the MAC PDU. The MAC layer 713 of the second Internet-of-vehicle device 72 receives the MAC PDU, and obtains the destination reception geographical location from the sub header of the MAC PDU.

At step 208, the second Internet-of-vehicle device transfers the user data packet in the MAC PDU to the application layer for processing when the destination reception geographical location and a geographical location of the second Internet-of-vehicle device satisfies a preset condition.

The second Internet-of-vehicle device obtains its current geographical location through a positioning component. The second Internet-of-vehicle device determines a coverage region based on a central point and the coverage radius. The central point is a point in a sub region identified by a sub-region identifier. The point may be a geometric center point or any point. The sub-region identifier is configured to represent the destination reception geographical location. The second Internet-of-vehicle device compares the destination reception geographical location and its own geographical location. The second Internet-of-vehicle device transfers the user data packet in the MAC PDU to the application layer for processing when the destination reception geographical location and its own geographical location satisfies the preset condition.

In some embodiments, a first vehicle is provided with the first Internet-of-vehicle device. The first vehicle is about to drive to an intersection and intends to turn right. A driver of the first vehicle turns on a right-turn signal. The first Internet-of-vehicle device transmits the physical layer data. The physical layer data carries the destination reception geographical location. Alternatively, the destination reception geographical location is represented by a sub-region identifier. A sub region includes at least one of a right-turn lane, a sidewalk at the intersection, and a road to be entered by the first Internet-of-vehicle device. For example, the destination reception geographical location is the right-turn lane, and the first Internet-of-vehicle device obtains a sub-region identifier of the right-turn lane.

A second vehicle is provided with the second Internet-of-vehicle device. The second Internet-of-vehicle device receives the physical layer data and obtains the destination reception geographical location. The second Internet-of-vehicle device obtains a current geographical location through the positioning component, and determines the geographical location of the second Internet-of-vehicle device based on a mapping relation. The second Internet-of-vehicle device determines a coverage region based on a central point and a coverage radius.

The central point is a point in the right-turn lane identified by the sub-region identifier. The sub-region identifier is configured to represent the destination reception geographical location. The MAC layer of the second Internet-of-vehicle device forwards the MAC PDU to the RLC layer and the application layer for processing when the geographical location of the second Internet-of-vehicle device belongs to the coverage region. The MAC layer ignores or discards the MAC PDU when the geographical location of the second Internet-of-vehicle device does not satisfy the preset condition.

In some embodiments, a first vehicle carries the first Internet-of-vehicle device. The first Internet-of-vehicle device sends the physical layer data carrying the destination reception geographical location when a driver of the first vehicle steps on the accelerator pedal to accelerate. The destination reception geographical location is represented by a sub-region identifier. The sub region includes a road section behind a road section where the first vehicle is located or a road section ahead of the road section where the first vehicle is located. For example, the sub region is the road section ahead of the road section where the first vehicle is located.

A second vehicle carries the second Internet-of-vehicle device. The second Internet-of-vehicle device receives the physical layer data and obtains the destination reception geographical location. The second Internet-of-vehicle device determines its own geographical location based on a mapping relation. The second Internet-of-vehicle device determines a coverage region based on a central point and a coverage radius. The coverage radius may be set by the first Internet-of-vehicle device based on a vehicle speed. The MAC layer of the second Internet-of-vehicle device forwards the MAC PDU to the RLC layer for processing when the geographical location of the second Internet-of-vehicle device belongs to the coverage region. The MAC layer ignores the MAC PDU when the geographical location of the second Internet-of-vehicle device does not satisfy the preset condition.

In conclusion, with the data transmission method for sidelink communication provided in embodiment of the present disclosure, the first Internet-of-vehicle device determines the destination reception geographical location of the user data packet, and generates the MAC PDU corresponding to the user data packet. The MAC PDU carries the destination reception geographical location. The first Internet-of-vehicle device encodes and modulates the MAC PDU to obtain the physical layer data, and transmits the physical layer data on the target time-frequency resource. The second Internet-of-vehicle device determines whether to receive the user data packet by comparing the destination reception geographical location carried by the MAC PDU, without pre-establishing a multicast group or determining a multicast address, reducing communication delay and improving communication efficiency.

Figure 8:
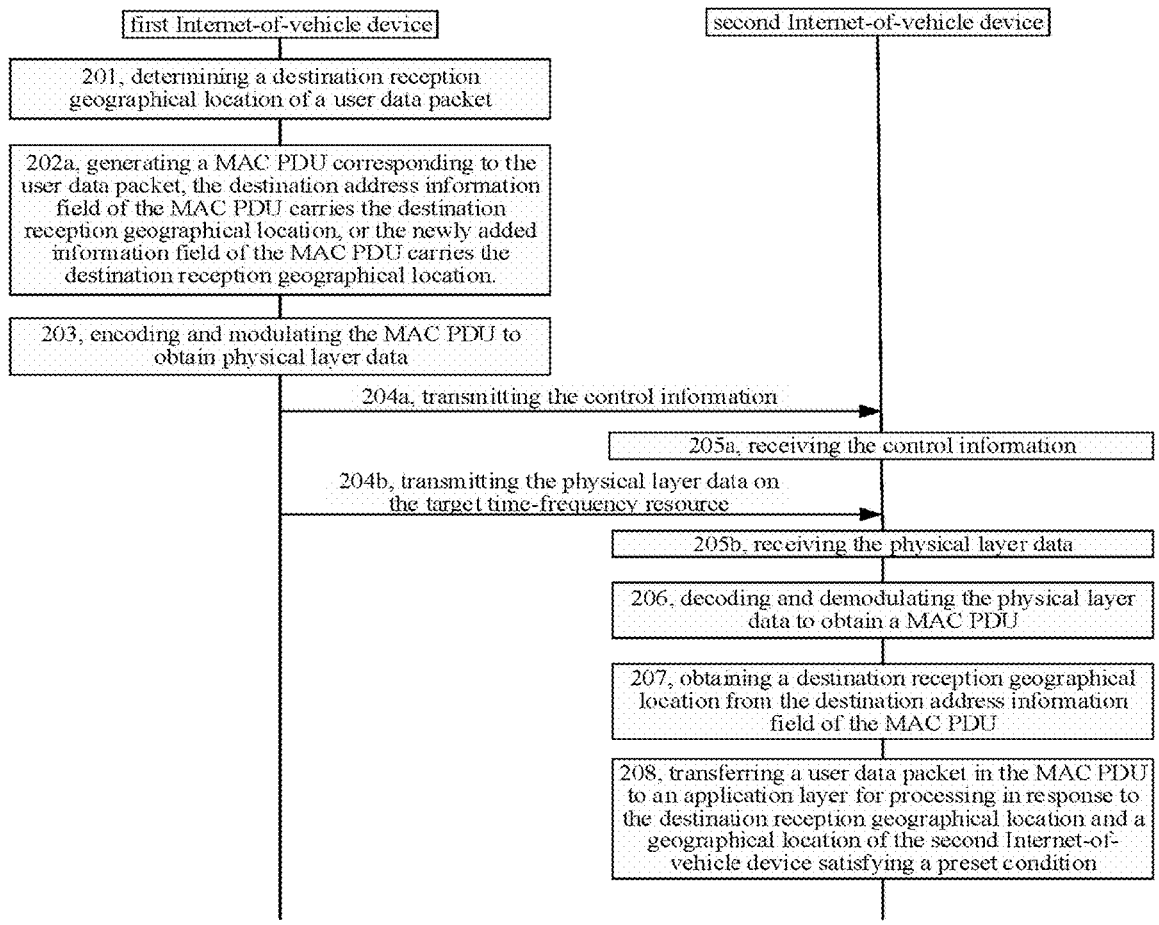
FIG. 8 is a flow chart illustrating a data transmission method for sidelink communication according to an exemplary embodiment.

In an alternative embodiment based on FIG. 2, as illustrated in FIG. 8, the destination address information field of the MAC PDU carries the destination reception geographical location. Alternatively, the newly added information field of the MAC PDU carries the destination reception geographical location. The above step 202 may be implemented as step 202a instead, step 204 may be implemented as step 204a and step 204b instead, and step 205 may be implemented as step 205a and step 205b instead. The substitutions may be as follows.

At step 202a, the first Internet-of-vehicle device generates the MAC PDU corresponding to the user data packet. The destination address information field of the MAC PDU carries the destination reception geographical location. Alternatively, the newly added information field of the MAC PDU carries the destination reception geographical location.

Figure 9:
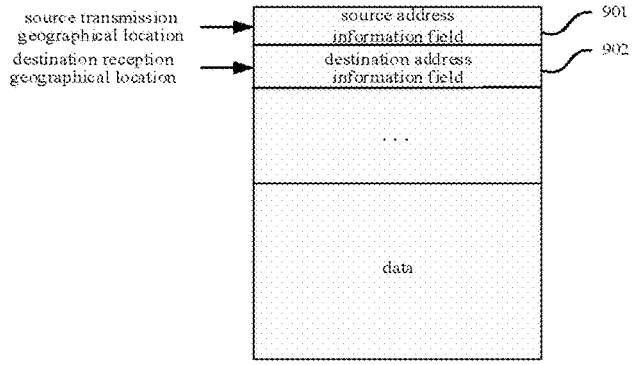
FIG. 9 is a schematic diagram illustrating a destination reception geographical location and a source transmission geographical location according to an exemplary embodiment.

As illustrated in FIG. 9, in some embodiments, the destination reception geographical location is carried in the destination address information field 902 of the MAC PDU to replace a destination MAC address need to be carried by the destination address information field 902 in original design.

Alternatively, the destination reception geographical location is represented by a sub-region identifier. For example, the sub-region identifier is 1 to 25, and 5 bits may be used to carry the sub-region identifier. When the destination address information field is 7 bits, it is greater than 5 bits. The remaining 2 bits may be filled with 0. For example, the remaining 2 bits are the last 2 bits.

Alternatively, the destination reception geographical location is represented by a sub-region identifier and a coverage radius. For example, the sub-region identifier is 1 to 25, and the coverage radius is any one of {20, 30, 40, 50} meters. The sub-region identifier may be carried by 5 bits, and 2 bits may be used to represent various coverage radiuses. Alternatively, the coverage radius is changeable. For example, the coverage radius has a positive correlation with a speed of a vehicle, or the coverage radius has a positive correlation with an importance level of the user data packet.

Figure 10:
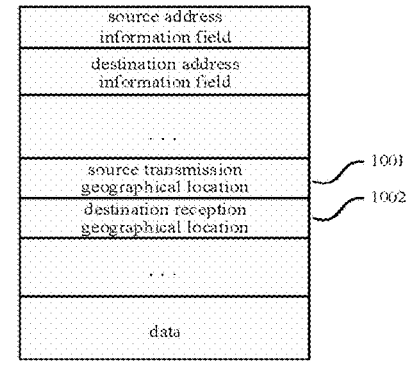
FIG. 10 is a schematic diagram illustrating a destination reception geographical location and a source transmission geographical location according to an exemplary embodiment.

As illustrated in FIG. 10, in some embodiments, the MAC PDU is provided with a newly added information field 1002. The newly added information field 1002 carries the destination reception geographical location.

Alternatively, the destination reception geographical location is represented by a sub-region identifier. For example, the sub-region identifier is 1 to 5, and 3 bits may be used to carry the sub-region identifier. A 3-bit newly added information field is set in the MAC PDU. When the newly added information field is 5 bits, the remaining 2 bits may be filled with 0. For example, the remaining 2 bits are the last 2 bits.

In some embodiments, the destination reception geographical location can be represented by a sub-region identifier and a coverage radius. For example, the sub-region identifier is 1 to 5, and the coverage radius is any one of {10, 15, 20, 30} meters. The sub-region identifier may be carried by 3 bits, and 2 bits may be used to represent various coverage radiuses. A 5-bit newly added information field is set in the MAC PDU. When the number of bits of the newly added information field is set to be greater than 5, the remaining bits may be filled with 0.

In some possible embodiments, a reserved field of the MAC PDU carries the destination reception geographical location. The MAC PDU is usually set with a reserved field, and the destination reception geographical location is filled into the reserved field.

At step 204a, the first Internet-of-vehicle device transmits control information. The control information is configured to instruct the second Internet-of-vehicle device to receive the physical layer data on the target time-frequency resource.

At step 205*a*, the second first Internet-of-vehicle device receives the control information. Alternatively, the second first Internet-of-vehicle device receives the control information before receiving the physical layer data or at the same time as receiving the physical layer data. The control information is configured to indicate a time-domain position and/or a frequency-domain position of the target time-frequency resource occupied by the physical layer data.

At step 204*b*, the first Internet-of-vehicle device transmits the physical layer data on the target time-frequency resource. Alternatively, the first Internet-of-vehicle device transmits the control information before transmitting the physical layer data or at the same time as transmitting the physical layer data. In this embodiment, for example, the first Internet-of-vehicle device transmits the control information before transmitting the physical layer data.

Alternatively, the control information is configured to indicate reception related information of the physical layer data. The reception related information includes the time-domain position and/or the frequency-domain position of the target time-frequency resource for carrying the physical layer data. In some embodiments, the reception related information may also include information such as a MCS, a HARQ-ID, and a NDI.

At step 205*b*, the second Internet-of-vehicle device receives the physical layer data. The second Internet-of-vehicle device receives the physical layer data according to the control information. Alternatively, the second Internet-of-vehicle device determines the time-domain position and/or the frequency-domain position of the target time-frequency resource according to the control information, and receives the physical layer data on the target time-frequency resource.

In conclusion, with the data transmission method for sidelink communication provided in embodiment of the present disclosure, the first Internet-of-vehicle device determines the destination reception geographical location of the user data packet, and generates the MAC PDU corresponding to the user data packet. The destination address information field of the MAC PDU carries the destination reception geographical location. The first Internet-of-vehicle device encodes and modulates the MAC PDU to obtain the physical layer data, and transmits the physical layer data on the target time-frequency resource. The second Internet-of-vehicle device determines whether to transfer the user data packet to the RLC layer by comparing the destination reception geographical location carried by the destination address information field of the MAC PDU. This method saves the information field of the MAC PDU by setting the destination reception geographical location in the destination address information field of the MAC PDU. Alternatively, the destination reception geographical location is set in the newly added information field in the MAC PDU, and the originally designed information field is retained.

Figure 11:
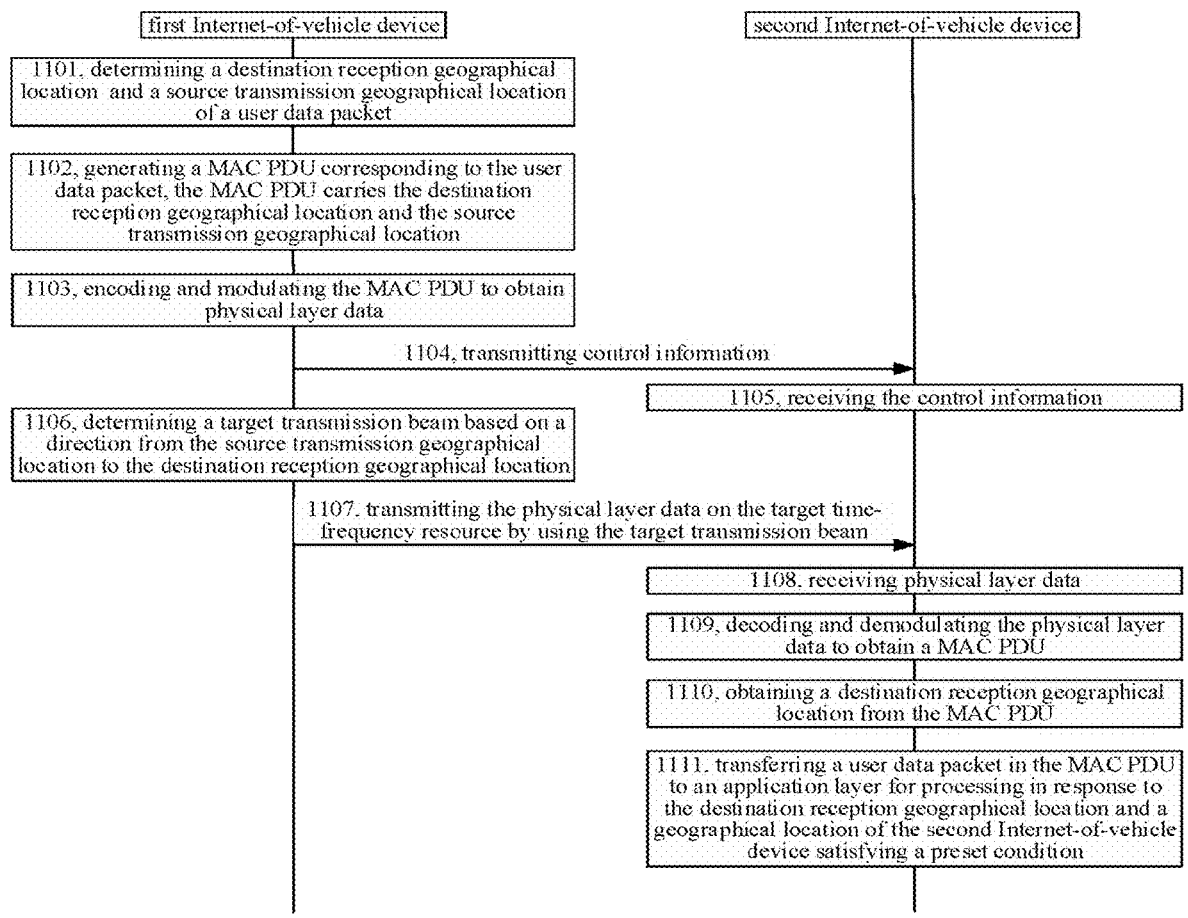
FIG. 11 is a flow chart illustrating a data transmission method for sidelink communication according to an exemplary embodiment.

FIG. 11 illustrates a data transmission method for sidelink communication provided in an exemplary embodiment of the present disclosure. As illustrated in FIG. 11, for example, the method is applied to the data transmission system for sidelink communication as illustrated in FIG. 1. The method includes follows.

At step 1101, a first Internet-of-vehicle device determines a destination reception geographical location and a source transmission geographical location of a user data packet. The source transmission geographical location is a geographical location where the first Internet-of-vehicle device is located at the time when an application layer of the first Internet-of-vehicle device generates the user data packet. The source transmission geographical location is obtained by the first Internet-of-vehicle device though a positioning component. The source transmission geographical location may be represented by a sub-region identifier. The manner for representing the source transmission geographical location by a sub-region identifier may be the same as the manner for representing the destination reception geographical location by a sub-region identifier, which will not be repeated herein.

The source transmission geographical location is a geographical location where the first Internet-of-vehicle device is located at the time when the first Internet-of-vehicle device generates the user data packet. The destination reception geographical location is a geographical location of a second Internet-of-vehicle device that may receive the user data packet.

The destination reception geographical location and the source transmission geographical location may be the same or different. When the destination reception geographical location and the source transmission geographical location is different, the source transmission geographical location is a sub set of the destination reception geographical location. Alternatively, the destination reception geographical location may be also related to a vehicle speed, a driving direction, and a data type of the user data packet.

At step 1102, the first Internet-of-vehicle device generates a MAC PDU corresponding to the user data packet. The MAC PDU carries the destination reception geographical location and the source transmission geographical location.

In some embodiments, the MAC PDU carries the source transmission geographical location. The source transmission geographical location refers to a geographical location where the first Internet-of-vehicle device is located at the time when the user data packet is sent. The source transmission geographical location is obtained via a positioning component. The first Internet-of-vehicle device determines a sub-region identifier corresponding to the current geographical location of the first Internet-of-vehicle device based on a mapping relation. The mapping relation is a correspondence relation between geographical locations and sub-region identifiers.

Alternatively, the mapping relation is pre-determined. Pre-determination refers to communication standard determination. The first Internet-of-vehicle device stores the pre-determined mapping relation in the first Internet-of-vehicle device. When the user data packet is transmitted, the first Internet-of-vehicle device determines the sub-region identifier corresponding to the current geographical location according to the geographical location obtained by the positioning component.

Alternatively, the mapping relation is pre-configured. Pre-configuration refers to a configuration method that a base station pre-configures the mapping relation for an Internet-of-vehicle device to use. Alternatively, the base station configures the mapping relation for the Internet-of-vehicle device through a system broadcast, or the base station configures the mapping relation for the Internet-of-vehicle device through radio resource control (RRC) dedicated signaling. Alternatively, the mapping relation is sent to the Internet-of-vehicle device by the base station through downlink signaling, or the mapping relation is transmitted to the Internet-of-vehicle device in a map message through the application layer.

As illustrated in FIG. 9, in some embodiments, the source transmission geographical location is carried in a source address information field 901 of the MAC PDU, replacing a source MAC address carried by the source address information field 901 in original design.

As illustrated in FIG. 10, in some embodiments, the source transmission geographical location is carried in a newly added information field 1001 of the MAC PDU.

At step 1103, the first Internet-of-vehicle device encodes and modulates the MAC PDU to obtain physical layer data.

At step 1104, the first Internet-of-vehicle device transmits control information. The first Internet-of-vehicle device may generate the control information. The control information is configured to indicate a time-domain position and/or a frequency-domain position of a target time-frequency resource occupied by the physical layer data. Alternatively, the control information is transmitted by the first Internet-of-vehicle device before the physical layer data is transmitted or at the same time as the physical layer data is transmitted.

At step 1105, the second Internet-of-vehicle device receives the control information.

At step 1106, the first Internet-of-vehicle device determines a target transmission beam based on a direction from the source transmission geographical location to the destination reception geographical location.

Figure 12:
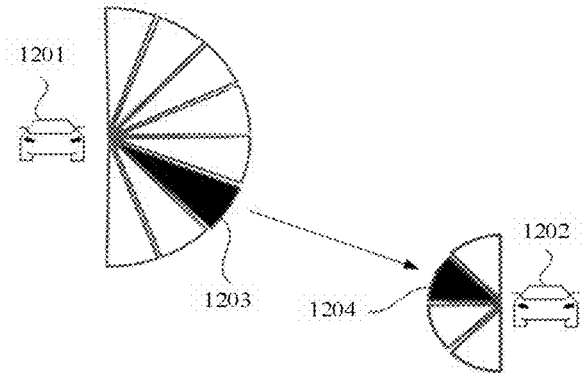
FIG. 12 is a schematic diagram illustrating a transmission beam of an Internet-of-vehicle device according to an exemplary embodiment.

In some embodiments, as illustrated in FIG. 12, a location where the first Internet-of-vehicle device 1201 is located is the source transmission geographical location, and a location where the second Internet-of-vehicle device 1202 is located is the destination reception geographical location. The first Internet-of-vehicle device 1201 determines the target transmission beam 1203 based on a direction from the source transmission geographical location to the destination reception geographical location.

At step 1107, the first Internet-of-vehicle device transmits the physical layer data on the target time-frequency resource by using the target transmission beam.

The details of step 1108 to step 1111 are the same or similar to those at steps 205 to 208, and are not repeated in this embodiment.

In conclusion, with the data transmission method for sidelink communication provided in embodiment of the present disclosure, the first Internet-of-vehicle device determines the destination reception geographical location of the user data packet, and generates the MAC PDU corresponding to the user data packet. The MAC PDU carries the destination reception geographical location and the source transmission geographical location. The first Internet-of-vehicle device encodes and modulates the MAC PDU to obtain the physical layer data, and transmits the physical layer data on the target time-frequency resource. On the one hand, the second Internet-of-vehicle device determines whether to receive the user data packet by comparing the destination reception geographical location carried by the MAC PDU, without pre-establishing a multicast group or determining a multicast address, reducing communication delay and improving communication efficiency. On the other hand, the first Internet-of-vehicle device may actively adjust the direction of the target transmission beam according to the destination geographical location, reducing the communication delay.

The above embodiments describe the data transmission method for sidelink communication when the destination geographical location is carried in the MAC PDU. The following embodiments will describe the data transmission method for sidelink communication provided by the present disclosure from an implementation that the destination geographical location is carried in the control information.

Figure 13:
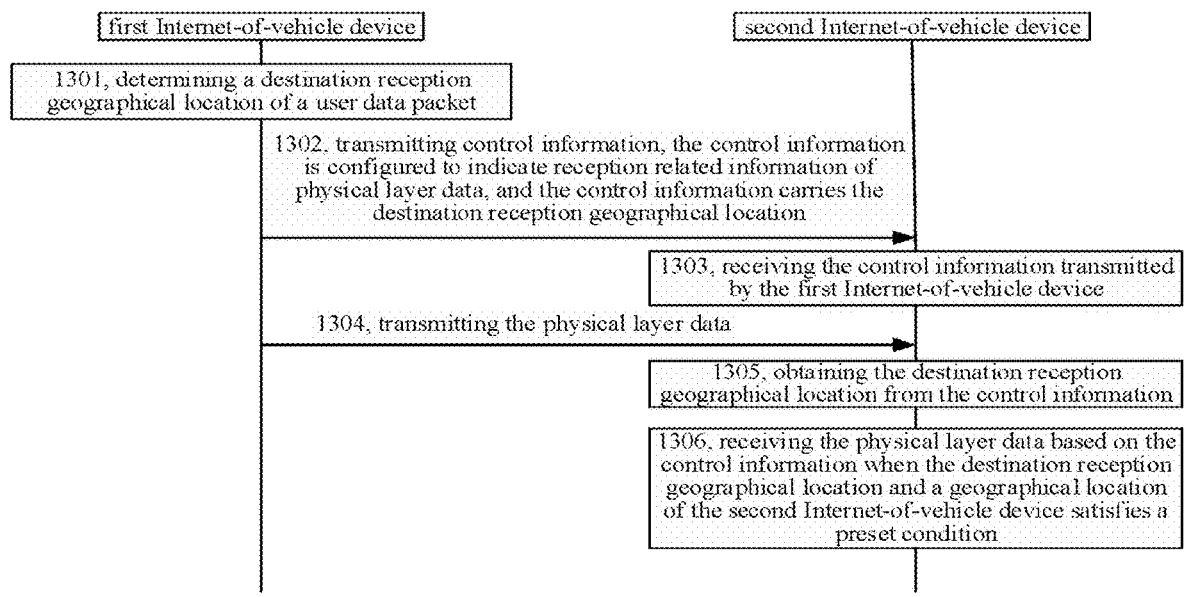
FIG. 13 is a schematic diagram illustrating a transmission beam of an Internet-of-vehicle device according to an exemplary embodiment.

FIG. 13 illustrates a transmission beam of an Internet-of-vehicle device provided in an exemplary embodiment of the present disclosure. For example, as illustrated in FIG. 13, the method may be applied to the data transmission system for sidelink communication as illustrated in FIG. 1. The method includes the followings.

At step 1301, a first Internet-of-vehicle device determines a destination reception geographical location of a user data packet. The user data packet is an Internet protocol (IP) data packet that the first Internet-of-vehicle device needs to send individually or in groups to a second Internet-of-vehicle device. The user data packet is generated by an application layer of the first Internet-of-vehicle device. For example, the first Internet-of-vehicle device generates the IP data packet for informing nearby vehicles of driving status of the first Internet-of-vehicle device when accelerating, braking, steering, changing lanes or malfunctioning.

The destination reception geographical location is used to indicate a reception range of the user data packet by using a geographical location. The destination reception geographical location may be one geographical point, multiple points, one geographical region, or multiple geographical regions.

The first Internet-of-vehicle device includes a GNSS. The first Internet-of-vehicle device determines the destination reception geographical location of the user data packet by using the GNSS. The GNSS includes America's GPS, China's Beidou system, Russia's GLONASS system, or the European Union's Galileo system, which is not limited in the disclosure.

In some embodiments, the destination reception geographical location is represented by a sub-region identifier. Alternatively, the sub-region identifier can be configured to identify a first sub region obtained by dividing the Earth's surface, and the first sub region is obtained by using a grid division method or a hexagonal division method. In some embodiments, sub-region identifiers corresponding to at least two sub regions may be the same, and a distance between the at least two sub regions with the same sub-region identifier is greater than a threshold. In some embodiments, each sub region corresponds to a unique sub-region identifier.

FIG. 3 illustrates a sub-region division method for the Earth's surface provided in an exemplary embodiment. Grid division is used to obtain multiple sub regions in this sub-region division method. Any two sub regions are disjoint, and each sub region has the same shape and is a rectangle. Each rectangle corresponds to its own sub-region identifier. The sub-region identifier may be represented by a number or other characters. For example, a sub region identified by number 1 may be called a sub region 1. The destination reception geographical location may be represented by any sub region and a number corresponding to the sub region. There are four sub regions identified with a sub-region identifier 1 in FIG. 3. A distance between any two sub regions identified with the sub-region identifier 1 is greater than a first threshold. For example, the first threshold is a side length of 4 grids.

Alternatively, the sub-region identifier is configured to identify a second sub region obtained by dividing a road. The second sub region is obtained by using a road section division method and/or a lane division method. In some embodiments, sub-region identifiers corresponding to at least two sub regions may be the same, and a distance between the at least two sub regions with the same sub-region identifier is greater than a threshold.

FIG. 4 illustrates a sub-region division method for a road provided in an exemplary embodiment. Road-section division is used to obtain multiple sub regions in this sub-region division method. Any two sub regions are disjoint, and each sub region has the same shape and each road section has the same length. Each road section corresponds to its own sub-region identifier. The sub-region identifier may be represented by a number. For example, a sub region identified by number 3 may be called a sub region 3. There are two sub regions identified with a sub-region identifier 3 in FIG. 4. A distance between the two sub regions 3 is greater than a second threshold 4. The second threshold refers to a length of four road sections.

Alternatively, the sub-region identifier is configured to identify a third sub region obtained by administrative division. The third sub region is obtained by using a country division method, a city division method, or a minimum administrative jurisdiction division method. In some embodiments, sub-region identifiers corresponding to at least two sub regions may be the same, and a distance between the at least two sub regions with the same sub-region identifier is greater than a threshold.

FIG. 5 illustrates an administrative sub-region division method provided in an exemplary embodiment. Any two sub regions are disjoint, and each sub region has the same shape. Each administrative region corresponds to its own sub-region identifier. The sub-region identifier may be represented by a number. For example, a sub region identified by number 2 may be called a sub region 2. There are two sub regions identified with a sub-region identifier 4 in FIG. 5. A distance between the two sub regions 4 is greater than a third threshold 1. The third threshold 1 means that the number of administrative regions between two administrative regions is at least one. This embodiment does not limit the shape and the identification method of the sub region, and the thresholds.

In some other embodiments, the destination reception geographical location is represented by a sub-region identifier and a coverage radius.

FIG. 6 illustrates a division method of sub regions provided in an exemplary embodiment. FIG. 6 includes multiple sub regions, and each sub region has the same shape and is a regular hexagon. Each regular hexagonal sub region corresponds to its own sub-region identifier. The sub-region identifier may be represented by a number and a coverage radius r. A circle is formed based on the coverage radius r, and the center of the circle is a center point of the regular hexagon. Alternatively, the center of the circle may be any point of the sub region. For example, a sub region is identified by number 5, and the sub region may be called sub region 5. When the coverage radius is r, the destination reception geographical location may be represented as a sub region 5-r, or (5, r).

At step 1302, the first Internet-of-vehicle device transmits control information. The control information is configured to indicate reception related information of physical layer data, and the control information carries the destination reception geographical location. The control information is configured to indicate a time-domain position and/or a frequency-domain position of a target time-frequency resource occupied by the physical layer data.

Alternatively, the reception related information includes the time-domain position and/or the frequency-domain position of the target time-frequency resource for carrying the physical layer data. In some embodiments, the reception related information may also include information such as a MCS, a HARQ-ID, and a NDI.

In some embodiments, the destination reception geographical location is within a target user identifier information field of the control information. An original design of the target user identifier information field is configured to carry an ID of a user device or other target user identifier information. Alternatively, the target user identifier information is a cell radio-network temporary identifier (C-RNTI). While, in an embodiment of the present disclosure, the target user identifier information field is configured to carry the destination reception geographical location.

In some embodiments, the destination reception geographical location is within a newly added information field of the control information. The newly added information field refers to a separate information field set in the control information.

In some embodiments, the destination reception geographical location is within a reserved information field of the control information. The reserved information field refers to a blank information field reserved in the control information.

At step 1303, the second Internet-of-vehicle device receives the control information transmitted by the first Internet-of-vehicle device.

At step 1304, the first Internet-of-vehicle device transmits the physical layer data.

At step 1305, the second Internet-of-vehicle device obtains the destination reception geographical location from the control information.

In some embodiments, the second Internet-of-vehicle device obtains the destination reception geographical location from the target user identifier information field of the control information. Further, the second Internet-of-vehicle device can obtain the destination reception geographical location from the newly added information field within the control information.

At step 1306, the second Internet-of-vehicle device receives the physical layer data based on the control information when the destination reception geographical location and a geographical location of the second Internet-of-vehicle device satisfies a preset condition.

The second Internet-of-vehicle device compares the destination reception geographical location and its own geographical location. When the destination reception geographical location and its own geographical location satisfies the preset condition, the second Internet-of-vehicle device receives the physical layer data on the target time-frequency resource based on the time-domain position and/or the frequency-domain position of the target time-frequency resource occupied by the physical layer data indicated by the control information.

In some embodiments, the second Internet-of-vehicle device obtains its current geographical location through a positioning component. The second Internet-of-vehicle device determines a coverage region based on a central point and the coverage radius. The central point is a point in a sub region identified by a sub-region identifier. The point may be a geometric center point or any point. The sub-region identifier is configured to represent the destination reception geographical location. The second Internet-of-vehicle device compares the destination reception geographical location and its own geographical location.

In some embodiments, the destination reception geographical location is represented by a sub-region identifier. For example, the destination reception geographical location is a sub region 5. The second Internet-of-vehicle device obtains its geographical location. When the geographical location of the second Internet-of-vehicle device is sub-region identifier 5, the destination reception geographical location and the geographical location of the second Internet-of-vehicle device satisfy the preset condition. The second Internet-of-vehicle device receives the physical layer data on the target time-frequency resource based on the time-domain position and/or the frequency-domain position of the target time-frequency resource occupied by the physical layer data indicated by the control information. When the geographical location of the second Internet-of-vehicle device does not belongs to the sub-region identifier 5, the second Internet-of-vehicle device does not receive the physical layer data.

In some embodiments, the destination reception geographical location is represented by a sub-region identifier and a coverage radius. For example, the destination reception geographical location is a sub region 9-$r$ (9, $r$), where $r$ is the coverage radius, and a coverage range is the area of a circle formed by taking any point in sub region 9 as the center and $r$ as the radius. The second Internet-of-vehicle device obtains its geographical location. When the geographical location of the second Internet-of-vehicle device is located within the coverage range, the destination reception geographical location and the geographical location of the second Internet-of-vehicle device satisfy the preset condition. The second Internet-of-vehicle device receives the physical layer data on the target time-frequency resource based on the time-domain position and/or the frequency-domain position of the target time-frequency resource occupied by the physical layer data indicated by the control information. When the geographical location of the second Internet-of-vehicle device does not belongs to the coverage range, the second Internet-of-vehicle device does not receive the physical layer data.

In conclusion, with the data transmission method for sidelink communication provided in embodiment of the present disclosure, the first Internet-of-vehicle device determines the destination reception geographical location of the user data packet, and transmits the control information carrying the destination reception geographical location. The second Internet-of-vehicle device receives the control information, and obtains the destination reception geographical location. The second Internet-of-vehicle device determines whether to receive the physical layer data based on the destination reception geographical location. When the destination reception geographical location and the geographical location of the second Internet-of-vehicle device satisfy the preset condition, the second Internet-of-vehicle device receive the physical layer data based on the control information, without pre-establishing a multicast group or determining a multicast address, reducing communication delay and improving communication efficiency.

Figure 14:
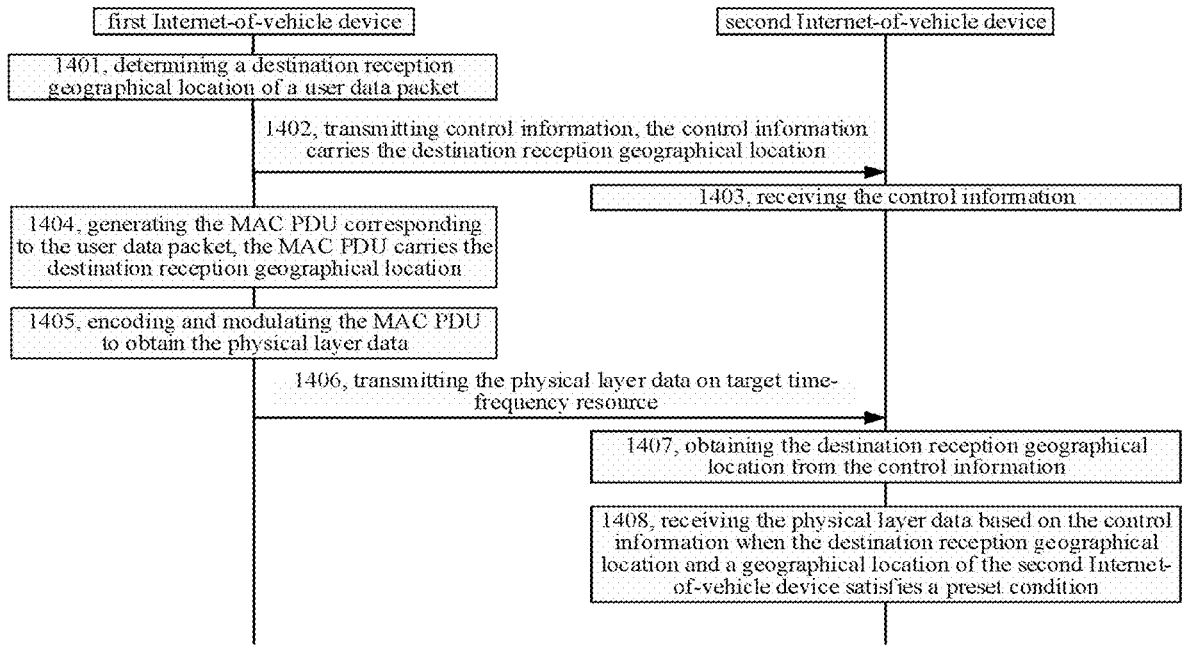
FIG. 14 is a flow chart illustrating a data transmission method for sidelink communication according to an exemplary embodiment.

In an alternative embodiment based on FIG. 13, FIG. 14 illustrates a data transmission method for sidelink communication provided in an exemplary embodiment of the present disclosure. The above step 1304 may be implemented as step 1404, step 1405, and step 1406 instead. The substitution steps may be as follows.

At step 1404, the first Internet-of-vehicle device generates the MAC PDU corresponding to the user data packet. The MAC PDU carries the destination reception geographical location. In some embodiments, the first Internet-of-vehicle device generates the MAC PDU corresponding to the user data packet. The MAC PDU does not carry the destination reception geographical location or carries the destination reception geographical location. An implementation process of this step may refer to the description of above step 202.

At step 1405, the first Internet-of-vehicle device encodes and modulates the MAC PDU to obtain the physical layer data. The physical layer receives the MAC PDU transmitted by the MAC layer, and encodes and modulates the MAC PDU to obtain the physical layer data. The physical layer is also called a transport block. Further, the physical layer further adds cyclic redundancy check (CRC) to the transport block for error detection at a reception end.

At step 1406, the first Internet-of-vehicle device transmits the physical layer data on target time-frequency resource. The first Internet-of-vehicle device carries the physical layer data on the target time-frequency resource of a physical channel, and transmits the physical layer data to the second Internet-of-vehicle device. Additionally, the first Internet-of-vehicle device may transmit control information to the second Internet-of-vehicle device before the physical layer data is transmitted or at the same time as the physical layer data is transmitted. The control information is configured to indicate reception related information of the physical layer data.

Alternatively, the reception related information includes a time-domain position and/or a frequency-domain position of the target time-frequency resource for carrying the physical layer data. In some embodiments, the reception related information further includes information such as information such as a MCS, a HARQ-ID, a NDI, and the like.

In conclusion, with the data transmission method for sidelink communication provided in embodiment of the present disclosure, the first Internet-of-vehicle device determines the destination reception geographical location of the user data packet, and transmits the control information carrying the destination reception geographical location. The first Internet-of-vehicle device transmits the control information, and the control information carries the destination reception geographical location. The first Internet-of-vehicle device generates the MAC PDU corresponding to the user data packet. The MAC PDU carries the destination reception geographical location. The first Internet-of-vehicle device encodes and modulates the MAC PDU to obtain the physical layer data, and transmits the physical layer data on target time-frequency resource. On the one hand, the second Internet-of-vehicle device may receive the control information, obtain the destination reception geographical location, and determine whether to receive the physical layer data. Alternatively, the second Internet-of-vehicle device may receive the physical layer data, and determine whether to receive the user data packet based on the destination reception geographical location carried by the MAC PDU in the physical layer data. The reception manner may be flexibly selected, thus reducing the communication delay and improving communication efficiency.

Figure 15:
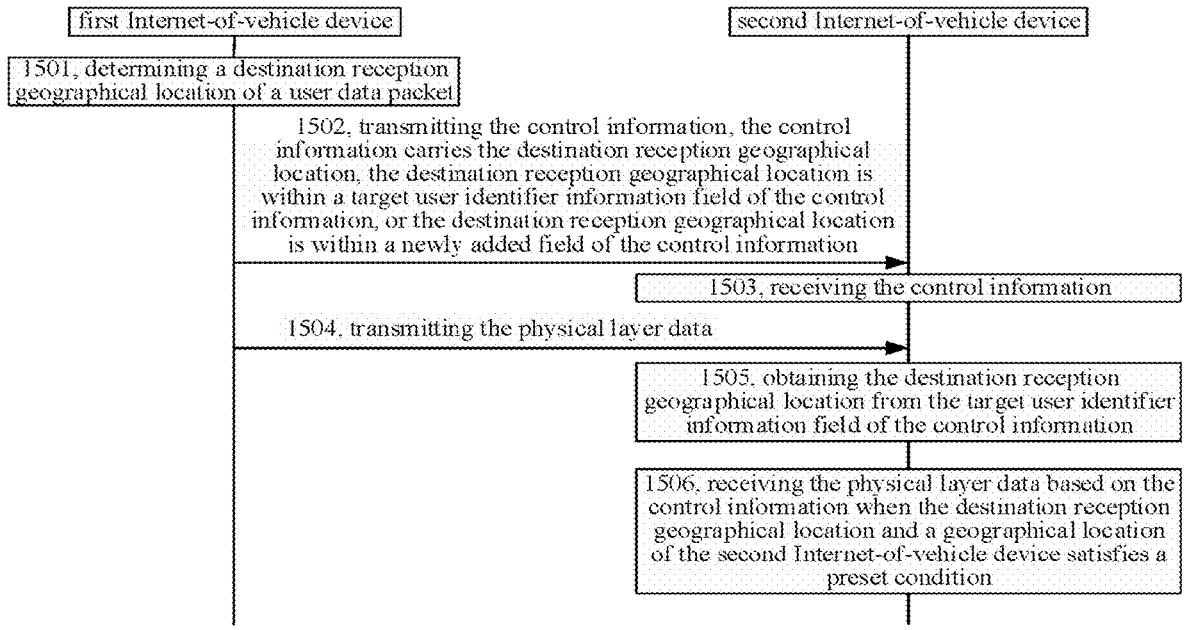
FIG. 15 is a flow chart illustrating a data transmission method for sidelink communication according to an exemplary embodiment.

In an alternative embodiment based on FIG. 13, as illustrated in FIG. 15, the control information carries the destination reception geographical location. The destination reception geographical location is within a target user identifier information field of the control information, or the destination reception geographical location is within a newly added field of the control information. The above step 1302 may be implemented as step 1502 instead. The substitution step may be as follows.

At step 1502, the first Internet-of-vehicle device transmits the control information. The control information carries the destination reception geographical location. The destination reception geographical location is within a target user identifier information field of the control information, or the destination reception geographical location is within a newly added field of the control information. In some embodiments, the destination reception geographical location is carried within the target user identifier information field of the control information.

Alternatively, the destination reception geographical location is represented by a sub-region identifier. For example, the sub-region identifier is 1 to 25, and 5 bits may be used to carry the sub-region identifier. When the destination address information field is 7 bits, it is greater than 5 bits. The remaining 2 bits may be filled with 0.

Alternatively, the destination reception geographical location is represented by a sub-region identifier and a coverage radius. For example, the sub-region identifier is 1 to 25, and the coverage radius is any one of {20, 30, 40, 50} meters. The sub-region identifier may be carried by 5 bits, and 2 bits may be used to represent various coverage radiuses.

In some embodiments, the control information is provided with a newly added information field. The newly added information field carries the destination reception geographical location.

Alternatively, the destination reception geographical location is represented by a sub-region identifier. For example, the sub-region identifier is 1 to 5, and 3 bits may be used to carry the sub-region identifier. A 3-bit newly added information field is set in the control information. When the newly added information field is 5 bits, the remaining 2 bits may be filled with 0. For example, the remaining 2 bits are the last 2 bits.

In conclusion, with the data transmission method for sidelink communication provided in embodiment of the present disclosure, the first Internet-of-vehicle device determines the destination reception geographical location of the user data packet, and transmits the control information carrying the destination reception geographical location. The second Internet-of-vehicle device receives the control information, and obtains the destination reception geographical location. On the one hand, the second Internet-of-vehicle device determines whether to receive the user data packet based on the destination reception geographical location, without pre-establishing a multicast group or determining a multicast address, thus reducing the communication delay and improving communication efficiency.

On the other hand, this method saves the information field of the MAC PDU by setting the destination reception geographical location in the destination address information field of the MAC PDU. Alternatively, the destination reception geographical location is set in the newly added information field in the MAC PDU, and the originally designed information field is retained.

FIG. 16 illustrates a data transmission method for sidelink communication provided in an exemplary embodiment of the present disclosure. As illustrated in FIG. 16, for example, the method is applied to the data transmission system for sidelink communication as illustrated in FIG. 1. The method includes follows.

At step 1601, a first Internet-of-vehicle device determines a destination reception geographical location of a user data packet. An implementation process of this step may refer to the description of the above step 1301.

At step 1602, the first Internet-of-vehicle device determines a target transmission beam based on a direction from a source transmission geographical location to the destination reception geographical location.

In some embodiments, as illustrated in FIG. 12, a location where the first Internet-of-vehicle device 1201 is located is the source transmission geographical location, and a location where the second Internet-of-vehicle device 1202 is located is the destination reception geographical location. The first Internet-of-vehicle device 1201 determines the target transmission beam 1203 based on a direction from the source transmission geographical location to the destination reception geographical location.

At step 1603, the first Internet-of-vehicle device transmits the control information by using the target transmission beam. The control information carries the destination reception geographical location and the source transmission geographical location.

In some embodiments, the MAC PDU carries the source transmission geographical location. The source transmission geographical location refers to a geographical location where the first Internet-of-vehicle device is located at the time when the user data packet is sent. The source transmission geographical location is obtained via a positioning component. The first Internet-of-vehicle device determines a sub-region identifier corresponding to the current geographical location of the first Internet-of-vehicle device based on a mapping relation. The mapping relation is a correspondence relation between geographical locations and sub-region identifiers.

At step 1604, a second Internet-of-vehicle device receives the control information. Alternatively, the second first Internet-of-vehicle device may receive the control information before receiving the physical layer data or at the same time as receiving the physical layer data. The control information is configured to indicate reception related information of the physical layer data. In this embodiment, for example, the second first Internet-of-vehicle device may receive the control information before receiving the physical layer data.

The control information is configured to indicate a time-domain position and/or a frequency-domain position of the target time-frequency resource occupied by the physical layer data. Alternatively, the reception related information includes a time-domain position and/or a frequency-domain position of the target time-frequency resource for carrying the physical layer data. In some embodiments, the reception related information further includes information such as information such as a MCS, a HARQ-ID, a NDI, and the like.

At step 1605, the first Internet-of-vehicle device transmits the physical layer data. The first Internet-of-vehicle device transmits the physical layer data on a target time-frequency resource indicated by the control information based on the control information.

At step 1606, the second Internet-of-vehicle device obtains the destination reception geographical location and the source transmission geographical location from the control information. The second Internet-of-vehicle device obtains the source transmission geographical location from a source address information field of the control information.

Alternatively, the second Internet-of-vehicle device obtains the destination reception geographical location from a target user identifier information field of the control information, or the second Internet-of-vehicle device obtains the destination reception geographical location from a newly added information field of the control information.

At step 1607, the second Internet-of-vehicle device determines a target reception beam based on a direction from the source transmission geographical location to the destination reception geographical location. The second Internet-of-vehicle device determines the target reception beam based on the received destination reception geographical location and the source transmission geographical location.

In some embodiments, the second Internet-of-vehicle device actively adjusts a direction for receiving the target reception beam based on the source transmission geographical location. The direction points to the target transmission beam.

At step 1608, the second Internet-of-vehicle device receives the physical layer data based on the control information by using the target reception beam when the destination reception geographical location and its own geographical location satisfy a preset condition.

In some embodiments, when determining that the geographical location of the second Internet-of-vehicle device belongs to a sub region corresponding to a sub-region identifier based on a mapping relation, the second Internet-of-vehicle device receives the physical layer data on a target time-frequency resource indicated by the control information by using the target reception beam. Alternatively, the mapping relation is pre-determined or pre-configured.

In some embodiments, the mapping relation is pre-determined. Pre-determination refers to communication standard determination. The first Internet-of-vehicle device stores the pre-determined mapping relation in the first Internet-of-vehicle device. When the user data packet is transmitted, the first Internet-of-vehicle device determines the sub-region identifier corresponding to the current geographical location according to the geographical location obtained by the positioning component.

In some embodiments, the mapping relation is pre-configured. Pre-configuration refers to a configuration method that a base station pre-configures the mapping relation for an Internet-of-vehicle device to use. Alternatively, the base station configures the mapping relation for the Internet-of-vehicle device through a system broadcast, or the base station configures the mapping relation for the Internet-of-vehicle device through RRC dedicated signaling. Alternatively, the mapping relation is sent to the Internet-of-vehicle device by the base station through downlink signaling, or the mapping relation is transmitted to the Internet-of-vehicle device in a map message through the application layer.

In some embodiments, the second Internet-of-vehicle device obtains its current geographical location through a positioning component. The second Internet-of-vehicle device determines a coverage region based on a central point and the coverage radius. The central point is a point in a sub region identified by a sub-region identifier. The point may be a geometric center point or any point. The sub-region identifier is configured to represent the destination reception geographical location. The second Internet-of-vehicle device compares the destination reception geographical location and its own geographical location. When the destination reception geographical location and its own geographical location satisfy the preset condition, the second Internet-of-vehicle device receives the physical layer data on the target time-frequency resource based on the control information.

In some embodiments, the destination reception geographical location is represented by a sub-region identifier. For example, the destination reception geographical location is a sub region 5. The second Internet-of-vehicle device obtains its geographical location. When the geographical location of the second Internet-of-vehicle device is sub-region identifier 5, the destination reception geographical location and the geographical location of the second Internet-of-vehicle device satisfy the preset condition. The second Internet-of-vehicle device receives the physical layer data on the target time-frequency resource based on the time-domain position and/or the frequency-domain position of the target time-frequency resource occupied by the physical layer data indicated by the control information. When the geographical location of the second Internet-of-vehicle device does not belong to the sub-region identifier 5, the second Internet-of-vehicle device does not receive the physical layer data.

In some embodiments, the destination reception geographical location is represented by a sub-region identifier and a coverage radius. For example, the destination reception geographical location is a sub region 9-$r$ (9, $r$), where $r$ is the coverage radius, and a coverage range is the area of a circle formed by taking any point in sub region 9 as the center and $r$ as the radius. The second Internet-of-vehicle device obtains its geographical location. When the geographical location of the second Internet-of-vehicle device is located within the coverage range, the destination reception geographical location and the geographical location of the second Internet-of-vehicle device satisfy the preset condition. The second Internet-of-vehicle device receives the physical layer data on the target time-frequency resource based on the time-domain position and/or the frequency-domain position of the target time-frequency resource occupied by the physical layer data indicated by the control information. When the geographical location of the second Internet-of-vehicle device does not belong to the coverage range, the second Internet-of-vehicle device does not receive the physical layer data.

In conclusion, with the data transmission method for sidelink communication provided in embodiment of the present disclosure, the first Internet-of-vehicle device determines the destination reception geographical location of the user data packet, and transmits the control information carrying the destination reception geographical location and the source transmission geographical location. The second Internet-of-vehicle device receives the control information, and obtains the destination reception geographical location and the source transmission geographical location. On the one hand, the second Internet-of-vehicle device determines whether to receive the physical layer data by comparing the destination reception geographical location, without pre-establishing a multicast group or determining a multicast address, reducing communication delay, thus improving communication efficiency. On the other hand, the second Internet-of-vehicle device adjusts the direction of the target reception beam according to the source transmission geographical location, reducing communication delay.

The followings are device the disclosure, which can be used to execute the method the disclosure. Details that are not disclosed in the device embodiments of the present disclosure may refer to the method the disclosure.

FIG. 17 is a block diagram illustrating a data transmission apparatus for sidelink communication according to an exemplary embodiment. The apparatus may implement part or all of the first Internet-of-vehicle device for data transmission method for sidelink communication through software, hardware or a combination of the two. Of course, it should be understood that one or more of the modules described in this disclosure can be implemented by hardware, such as circuitry. The apparatus may include followings.

A first determining module 1701 is configured to determine a destination reception geographical location of a user data packet.

A first generating module 1702 is configured to generate a MAC PDU corresponding to the user data packet. The MAC PDU carries the destination reception geographical location.

A first processing module 1703 is configured to encode and modulate the MAC PDU to obtain physical layer data.

A first transmitting module 1704 is configured to transmit the physical layer data on target time-frequency resource.

In some embodiments, the destination reception geographical location is represented by a sub-region identifier; or the destination reception geographical location is represented by a sub-region identifier and a coverage radius.

Alternatively, the sub-region identifier is configured to identify a first sub region obtained by dividing the Earth's surface, and the first sub region is obtained by using a grid division method or a hexagonal division method; and/or the sub-region identifier is configured to identify a second sub region obtained by dividing a road, and the second sub region is obtained by using a road section division method and/or a lane division method; and/or the sub-region identifier is configured to identify a third sub region obtained by administrative division, and the third sub region is obtained by using a country division method, a city division method, or a minimum administrative jurisdiction division method.

In some embodiments, sub-region identifiers corresponding to at least two sub regions are same, and a distance between the at least two sub regions with the same sub-region identifier is greater than a threshold.

In some possible implementations, the destination reception geographical location is within a destination address information field of the MAC PDU or the destination reception geographical location is within a newly added information field of the MAC PDU.

In some embodiments, the MAC PDU further carries a source transmission geographical location.

In some embodiments, as illustrated in FIG. 18, the apparatus provided in this embodiment may further include the following.

A positioning module 1705 is configured to obtain a current geographical location via a positioning component.

The first determining module 1701 is configured to determine a sub-region identifier corresponding to the current geographical location based on a mapping relation. The mapping relation is a correspondence relation between geographical locations and sub-region identifiers. Alternatively, the mapping relation is pre-determined or pre-configured.

In some embodiments, the first determining module 1701 is configured to determine a target transmission beam based on a direction from the source transmission geographical location to the destination reception geographical location.

The first transmission module 1704 configured to transmit the physical layer data on the target time-frequency resource by using the target transmission beam.

In conclusion, with the data transmission apparatus for sidelink communication provided in embodiment of the present disclosure, the first Internet-of-vehicle device determines the destination reception geographical location of the user data packet, and generates the MAC PDU corresponding to the user data packet. The MAC PDU carries the destination reception geographical location. The first Internet-of-vehicle device encodes and modulates the MAC PDU to obtain the physical layer data, and transmits the physical layer data on the target time-frequency resource. The second Internet-of-vehicle device determines whether to receive the physical layer data by comparing the destination reception geographical location carried by the MAC PDU, without pre-establishing a multicast group or determining a multicast address, reducing communication delay, thus improving communication efficiency.

Figure 19:
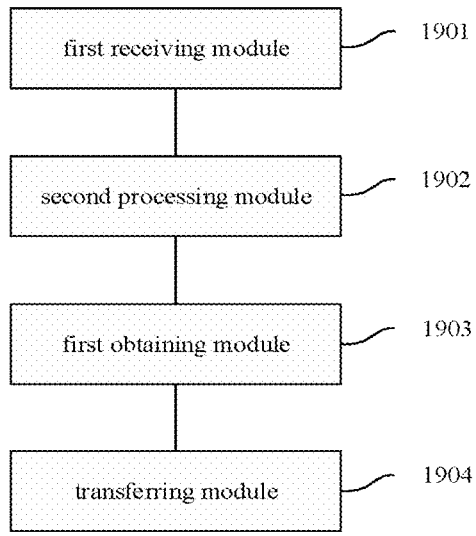
FIG. 19 is a block diagram illustrating a data transmission apparatus for sidelink communication according to an exemplary embodiment.

FIG. 19 is a block diagram illustrating a data transmission apparatus for sidelink communication according to an exemplary embodiment. The apparatus may implement part or all of the first Internet-of-vehicle device for data transmission method for sidelink communication through software, hardware or a combination of the two. The apparatus may include followings.

A first receiving module 1901 is configured to receive physical layer data on target time-frequency resource.

A second processing module 1902 is configured to decode and demodulate the physical layer data to obtain a MAC PDU.

A first obtaining module 1903 is configured to obtain a destination reception geographical location from the MAC PDU.

A transferring module 1904 is configured to transfer a user data packet in the MAC PDU to an application layer for processing in response to the destination reception geographical location and a geographical location of the second Internet-of-vehicle device satisfying a preset condition.

In some embodiments, the destination reception geographical location is represented by a sub-region identifier.

Transferring, by the second Internet-of-vehicle device, the user data packet in the MAC PDU to the application layer for processing in response to the destination reception geographical location and the geographical location of the second Internet-of-vehicle device satisfying the preset condition includes: transferring, by the second Internet-of-vehicle device, the user data packet in the MAC PDU to the application layer for processing in response to determining that the geographical location of the second Internet-of-vehicle device belongs to a sub region corresponding to the sub-region identifier based on a mapping relation.

In some embodiments, the destination reception geographical location is represented by a sub-region identifier and a coverage radius.

Transferring, by the second Internet-of-vehicle device, the user data packet in the MAC PDU to the application layer for processing in response to the destination reception geographical location and the geographical location of the second Internet-of-vehicle device satisfying the preset condition includes: determining, by the second Internet-of-vehicle device, a coverage region based on a central point and the coverage radius, in which the central point is a point in a sub region identified by the sub-region identifier; and transferring, by the second Internet-of-vehicle device, the user data packet in the MAC PDU to the application layer for processing in response to determining that the geographical location of the second Internet-of-vehicle device belongs to the coverage region based on a mapping relation. Alternatively, the mapping relation is pre-determined or pre-configured.

Alternatively, the sub-region identifier is configured to identify a first sub region obtained by dividing the Earth's surface, and the first sub region is obtained by using a grid division method or a hexagonal division method; and/or the sub-region identifier is configured to identify a second sub region obtained by dividing a road, and the second sub region is obtained by using a road section division method and/or a lane division method; and/or the sub-region identifier is configured to identify a third sub region obtained by administrative division, and the third sub region is obtained by using a country division method, a city division method, or a minimum administrative jurisdiction division method.

In some embodiments, sub-region identifiers corresponding to at least two sub regions are same, and a distance between the at least two sub regions with the same sub-region identifier is greater than a threshold.

In some embodiments, the destination reception geographical location is within a destination address information field of the MAC PDU; or the destination reception geographical location is within a newly added information field of the MAC PDU. In some embodiments, the MAC PDU further carries a source transmission geographical location.

In conclusion, with the data transmission apparatus for sidelink communication provided in embodiment of the present disclosure, the first Internet-of-vehicle device determines the destination reception geographical location of the user data packet, and generates the MAC PDU corresponding to the user data packet. The MAC PDU carries the destination reception geographical location. The first Internet-of-vehicle device encodes and modulates the MAC PDU to obtain the physical layer data, and transmits the physical layer data on the target time-frequency resource. The second Internet-of-vehicle device determines whether to receive the physical layer data by comparing the destination reception geographical location carried by the MAC PDU, without pre-establishing a multicast group or determining a multicast address, reducing communication delay, thus improving communication efficiency.

Figure 20:
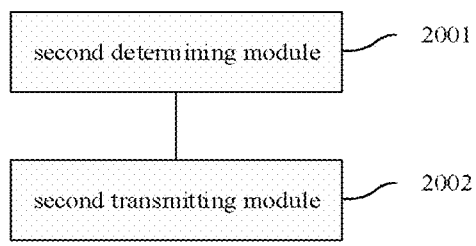
FIG. 20 is a block diagram illustrating a data transmission apparatus for sidelink communication according to an exemplary embodiment.

FIG. 20 is a block diagram illustrating a data transmission apparatus for sidelink communication according to an exemplary embodiment. The apparatus may implement part or all of the first Internet-of-vehicle device for data transmission method for sidelink communication through software, hardware or a combination of the two. The apparatus may include followings.

A second determining module 2001 that is configured to determine a destination reception geographical location of a user data packet.

A second transmitting module 2002 that is configured to transmit control information to a second Internet-of-vehicle device. The control information is configured to indicate reception related information of physical layer data. The control information carries the destination reception geographical location. The second transmitting module 2002 is further configured to transmit the physical layer data by the first Internet-of-vehicle device.

Figure 21:
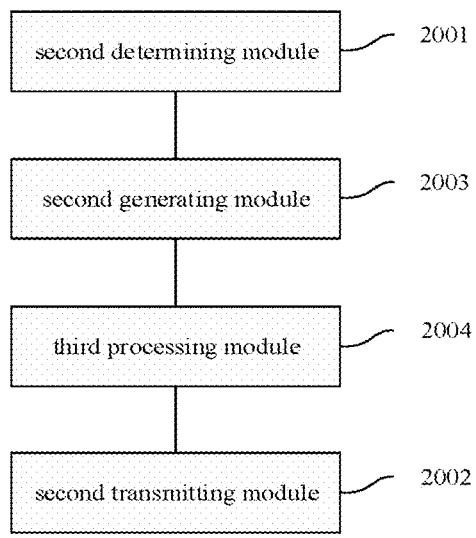
FIG. 21 is a block diagram illustrating a data transmission apparatus for sidelink communication according to an exemplary embodiment.

In some embodiments, as illustrated in FIG. 21, the apparatus further includes the following.

A second generating module 2003 that is configured to generate a MAC PDU corresponding to the user data packet. The MAC PDU carries the destination reception geographical location.

A third processing module 2004 that is configured to encode and modulate the MAC PDU to obtain the physical layer data.

The second transmitting module 2002 is configured to transmit the physical layer data on target time-frequency resource.

In some embodiments, the destination reception geographical location is represented by a sub-region identifier; or the destination reception geographical location is represented by a sub-region identifier and a coverage radius. Alternatively, the sub-region identifier is configured to identify a first sub region obtained by dividing the Earth's surface, and the first sub region is obtained by using a grid division method or a hexagonal division method; and/or the sub-region identifier is configured to identify a second sub region obtained by dividing a road, and the second sub region is obtained by using a road section division method and/or a lane division method; and/or the sub-region identifier is configured to identify a third sub region obtained by administrative division, and the third sub region is obtained by using a country division method, a city division method, or a minimum administrative jurisdiction division method.

In some embodiments, sub-region identifiers corresponding to at least two sub regions are same, and a distance between the at least two sub regions with the same sub-region identifier is greater than a threshold.

In some embodiments, the destination reception geographical location is within a target user identifier information field of the control information or the destination reception geographical location is within a newly added information field of the control information.

In some embodiments, the control information further carries a source transmission geographical location. The source transmission geographical location is represented by a sub-region identifier. The apparatus further includes follows.

A second positioning module is configured to obtain a current geographical location via a positioning component. The second determining module 2001 is configured to determine a sub-region identifier corresponding to the current geographical location based on a mapping relation. The mapping relation is a correspondence relation between geographical locations and sub-region identifiers. Alternatively, the mapping relation is pre-determined or pre-configured.

In some embodiments, the second determining module 2001 is configured to determine a target transmission beam based on a direction from the source transmission geographical location to the destination reception geographical location.

The second transmitting module 2202 is configured to transmit the control information by using the target transmission beam.

In conclusion, with the data transmission apparatus for sidelink communication provided in embodiment of the present disclosure, the first Internet-of-vehicle device determines the destination reception geographical location of the user data packet, transmits the control information carrying the destination reception geographical location. The second Internet-of-vehicle device receives the control information, and obtains the destination reception geographical location. The second Internet-of-vehicle device determines whether to receive the physical layer data based on the destination reception geographical location, without pre-establishing a multicast group or determining a multicast address, reducing communication delay, thus improving communication efficiency.

Figure 22:
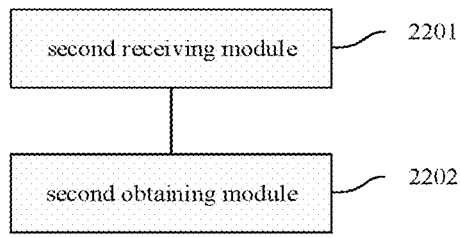
FIG. 22 is a block diagram illustrating a data transmission apparatus for sidelink communication according to an exemplary embodiment.

FIG. 22 is a block diagram illustrating a data transmission apparatus for sidelink communication according to an exemplary embodiment. The apparatus may implement part or all of the first Internet-of-vehicle device for data transmission method for sidelink communication through software, hardware or a combination of the two. The apparatus may include followings.

A second receiving module 2201 that is configured to receive control information sent by a first Internet-of-vehicle device. The control information that is configured to indicate reception related information of physical layer data.

A second obtaining module 2202 that is configured to obtain a destination reception geographical location from the control information.

The second receiving module 2201 is further configured to receive the physical layer data based on the control information in response to the destination reception geographical location and a geographical location of the second Internet-of-vehicle device satisfying a preset condition. In some embodiments, the destination reception geographical location is represented by a sub-region identifier.

Receiving, by the second Internet-of-vehicle device, the physical layer data based on the control information in response to the destination reception geographical location and the geographical location of the second Internet-of-vehicle device satisfying the preset condition includes: receiving, by the second Internet-of-vehicle device, the physical layer data based on the control information in response to determining that the geographical location of the second Internet-of-vehicle device belongs to a sub region corresponding to the sub-region identifier based on a mapping relation. In some embodiments, the destination reception geographical location is represented by a sub-region identifier and a coverage radius.

Receiving, by the second Internet-of-vehicle device, the physical layer data based on the control information in response to the destination reception geographical location and the geographical location of the second Internet-of-vehicle device satisfying the preset condition includes: determining, by the second Internet-of-vehicle device, a coverage region based on a central point and the coverage radius, in which the central point is a point in a sub region identified by the sub-region identifier; and receiving, by the second Internet-of-vehicle device, the physical layer data based on the control information in response to determining that the geographical location of the second Internet-of-vehicle device belongs to the coverage region based on a mapping relation. Alternatively, the mapping relation is pre-determined or pre-configured.

Alternatively, the sub-region identifier is configured to identify a first sub region obtained by dividing the Earth's surface, and the first sub region is obtained by using a grid division method or a hexagonal division method; and/or the sub-region identifier is configured to identify a second sub region obtained by dividing a road, and the second sub region is obtained by using a road section division method and/or a lane division method; and/or the sub-region identifier is configured to identify a third sub region obtained by administrative division, and the third sub region is obtained by using a country division method, a city division method, or a minimum administrative jurisdiction division method.

In some embodiments, sub-region identifiers corresponding to at least two sub regions are same, and a distance between the at least two sub regions with the same sub-region identifier is greater than a threshold.

In some embodiments, the destination reception geographical location is within a target user identifier information field of the control information or the destination reception geographical location is within a newly added information field of the control information.

In some embodiments, the control information further carries a source transmission geographical location.

Figure 23:
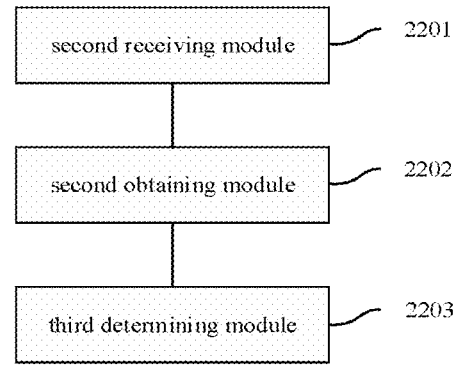
FIG. 23 is a block diagram illustrating a data transmission apparatus for sidelink communication according to an exemplary embodiment.

In some embodiments, as illustrated in FIG. 23, the apparatus further includes a third determining module 2203. The third determining module 2203 is configured to determine a target reception beam based on a direction from the source transmission geographical location to the destination reception geographical location. The second receiving module 2201 is configured to receive the physical layer data on target time-frequency resource based on a reception mode indicated by the control information by using the target reception beam.

In conclusion, with the data transmission apparatus for sidelink communication provided in embodiment of the present disclosure, the first Internet-of-vehicle device determines the destination reception geographical location of the user data packet, and transmits the control information carrying the destination reception geographical location and the source transmission geographical location. The second Internet-of-vehicle device receives the control information, and obtains the destination reception geographical location and the source transmission geographical location. On the one hand, the second Internet-of-vehicle device determines whether to receive the physical layer data by comparing the destination reception geographical location, without pre-establishing a multicast group or determining a multicast address, reducing communication delay, thus improving communication efficiency. On the other hand, the second Internet-of-vehicle device adjusts the direction of the target reception beam according to the source transmission geographical location, reducing communication delay.

Figure 24:
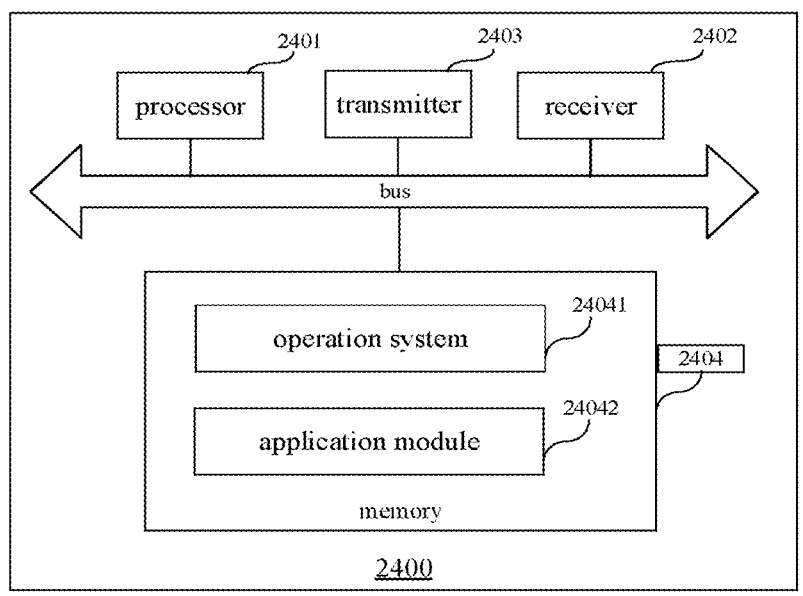
FIG. 24 is a block diagram illustrating an Internet-of-vehicle device according to an exemplary embodiment.

FIG. 24 is a block diagram illustrating an Internet-of-vehicle device according to an exemplary embodiment. For example, the Internet-of-vehicle device 2400 may be the first Internet-of-vehicle device or the second Internet-of-vehicle device. As illustrated in FIG. 24, the Internet-of-vehicle device 2400 may include a processor 2401, a receiver 2402, a transmitter 2403 and a memory 2404. The receiver 2402, the transmitter 2403 and the memory 2404 are respectively connected to the processor 2401 via buses.

The processor 2401 includes one or more processing cores. The processor 2401 runs software programs and modules to implement the methods implemented by the first Internet-of-vehicle device or the second Internet-of-vehicle device in the data transmission method for sidelink communication provided by the embodiments of the present disclosure. The memory 2404 may be configured to store software programs and modules. In detail, the memory 2404 may store an operation system 24041 and an application module 24042 required by at least one function. The receiver 2402 is configured to receive communication data sent by other devices. The transmitter 2403 is configured to send communication data to other devices.

In an exemplary embodiment, a non-transitory computer-readable storage medium is further provided. The computer-readable storage medium is a non-volatile computer readable storage media. The computer-readable storage medium has computer programs stored thereon that, when executed by a processing component, cause the processing component to be able to implement the data transmission method for sidelink communication provided in above embodiments of the present disclosure.

The present disclosure further provides a computer program product. The computer program product has instructions stored thereon that, when executed on a computer, cause the computer to be able to implement the data transmission method for sidelink communication provided in above embodiments of the present disclosure.

The present disclosure further provides a chip. The chip includes programmable logic circuits and/or program instructions. When the chip operates, the data transmission method for sidelink communication provided in embodiments of the present disclosure is implemented.

It is understood that, "plurality" mentioned herein refers to two or more. "And/or" describes a relation of the related objects, indicating three relations. For example, "A and/or B" indicates three conditions, i.e., A exists alone, A and B exist simultaneously, and B exists alone. The character "I" generally indicates that it is either the former related object or the latter related object.

Those skilled in the art easily think of other embodiments of the present disclosure after considering the description and practicing the present disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the appended claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A data transmission method for sidelink communication, the method being applied to a first Internet-of-vehicle device and comprising:
   determining a destination reception geographical location of a user data packet, wherein the destination reception geographical location is represented by: a sub-region identifier, or a sub-region identifier and a coverage radius, wherein the sub-region identifier is configured to identify a second sub region obtained by dividing a road, the second sub region being obtained by using at least one of a road section division method and a lane division method;
   generating a media access control packet data unit (MAC PDU) corresponding to the user data packet;
   encoding and modulating the MAC PDU in order to obtain physical layer data; and
   transmitting the physical layer data on a target time-frequency resource, and transmitting control information to a second Internet-of-vehicle device before or at the same time as the physical layer data is transmitted, the control information carries the destination reception geographical location and a source transmission geographical location, and the source transmission geographical location is represented by the sub-region identifier.

2. The method of claim 1, wherein the sub-region identifier is further configured to identify at least one of:
   a first sub region obtained by dividing the Earth's surface, the first sub region being obtained by using a grid division method or a hexagonal division method, and
   a third sub region obtained by administrative division, the third sub region being obtained by using a country division method, a city division method, or a minimum administrative jurisdiction division method.

3. The method of claim 1, wherein sub-region identifiers corresponding to at least two sub regions are same, and a distance between the at least two sub regions with the same sub-region identifier is greater than a threshold.

4. The method of claim 1, wherein the MAC PDU further carries the source transmission geographical location.

5. The method of claim 1, wherein the method further comprises:
   obtaining a current geographical location via a positioning component; and
   determining a sub-region identifier corresponding to the current geographical location based on a mapping relation that is a correspondence relation between geographical locations and sub-region identifiers.

6. A data transmission method for sidelink communication, the method being applied to a second Internet-of-vehicle device and comprising:
   receiving physical layer data on a target time-frequency resource, and receiving control information, wherein the control information is transmitted before or at the same time as the physical layer data is transmitted by a first Internet-of-vehicle device, the control information carries a destination reception geographical location and a source transmission geographical location, the source transmission geographical location is represented by a sub-region identifier, and the destination reception geographical location is represented by: a sub-region identifier, or a sub-region identifier and a coverage radius, wherein the sub-region identifier is configured to identify a second sub region obtained by dividing a road, the second sub region being obtained by using at least one of a road section division method and a lane division method;
   decoding and demodulating the physical layer data in order to obtain a media access control packet data unit (MAC PDU);
   obtaining a destination reception geographical location from the MAC PDU; and
   transferring a user data packet in the MAC PDU to an application layer for processing when the destination reception geographical location and a geographical location of the second Internet-of-vehicle device satisfy a preset condition.

7. The method of claim 6, wherein:
   the destination reception geographical location is represented by a sub-region identifier;
   transferring the user data packet in the MAC PDU to the application layer for processing when the destination reception geographical location and the geographical location of the second Internet-of-vehicle device satisfies the preset condition comprises:
   transferring the user data packet in the MAC PDU to the application layer for processing when determining that the geographical location of the second Internet-of-vehicle device belongs to a sub region corresponding to the sub-region identifier based on a mapping relation.

8. The method of claim 6, wherein:
   the destination reception geographical location is represented by a sub-region identifier and a coverage radius;
   transferring the user data packet in the MAC PDU to the application layer for processing when the destination reception geographical location and the geographical location of the second Internet-of-vehicle device satisfies the preset condition comprises:
   determining a coverage region based on a central point and the coverage radius, wherein the central point is a point in a sub region identified by the sub-region identifier; and
   transferring the user data packet in the MAC PDU to the application layer for processing when determining that the geographical location of the second Internet-of-vehicle device belongs to the coverage region based on a mapping relation.

9. The method of claim 7, wherein the sub- region identifier is further configured to identify at least one of:
   a first sub region obtained by dividing the Earth's surface, and the first sub region is obtained by using a grid division method or a hexagonal division method, and
   a third sub region obtained by administrative division, and the third sub region is obtained by using a country division method, a city division method, or a minimum administrative jurisdiction division method.

10. The method of claim 6, wherein sub-region identifiers corresponding to at least two sub regions are the same, and a distance between the at least two sub regions with the same sub-region identifier is greater than a threshold.

11. The method of claim 6, wherein the MAC PDU further carries the source transmission geographical location.

12. A data transmission method for sidelink communication, the method being applied to a first Internet-of-vehicle device and comprising:
- determining a destination reception geographical location of a user data packet, wherein the destination reception geographical location is represented by: a sub-region identifier, or a sub-region identifier and a coverage radius, wherein the sub-region identifier is configured to identify a second sub region obtained by dividing a road, the second sub region being obtained by using at least one of a road section division method and a lane division method;
- transmitting control information to a second Internet-of-vehicle device, where the control information is configured to indicate reception related information of physical layer data and carry the destination reception geographical location and a source transmission geographical location, and the source transmission geographical location is represented by the sub-region identifier; and
- transmitting the physical layer data before or at the same time as the control information is transmitted.

13. The method of claim 12, wherein transmitting the physical layer data further comprises:
- generating a media access control packet data unit (MAC PDU) corresponding to the user data packet, where the MAC PDU carries the destination reception geographical location;
- encoding and modulating the MAC PDU in order to obtain the physical layer data; and
- transmitting the physical layer data on a target time-frequency resource.

14. The method of claim 12, wherein the sub-region identifier is further configured to identify at least one of:
- a first sub region obtained by dividing the Earth's surface, and the first sub region is obtained by using a grid division method or a hexagonal division method, and
- a third sub region obtained by administrative division, and the third sub region is obtained by using a country division method, a city division method, or a minimum administrative jurisdiction division method.

15. The method of claim 12, wherein, sub-region identifiers corresponding to at least two sub regions are same, and a distance between the at least two sub regions with the same sub-region identifier is greater than a threshold.

16. The method of claim 12, wherein the method further comprises:
- obtaining a current geographical location via a positioning component; and
- determining a sub-region identifier corresponding to the current geographical location based on a mapping relation, where the mapping relation is a correspondence relation between geographical locations and sub-region identifiers.

17. A data transmission method for sidelink communication, the method being applied to a second Internet-of-vehicle device and comprising:
- receiving control information sent by a first Internet-of-vehicle device, where the control information is configured to indicate reception related information of physical layer data, the control information is transmitted before or at the same time as the physical layer data is transmitted to the second Internet-of-vehicle device by the first Internet-of-vehicle device, the control information carries a destination reception geographical location and a source transmission geographical location, the source transmission geographical location is represented by a sub-region identifier;
- obtaining the destination reception geographical location from the control information, wherein the destination reception geographical location is represented by: a sub-region identifier, or a sub-region identifier and a coverage radius, wherein the sub-region identifier is configured to identify a second sub region obtained by dividing a road, the second sub region being obtained by using at least one of a road section division method and a lane division method; and
- receiving the physical layer data based on the control information when the destination reception geographical location and a geographical location of the second Internet-of-vehicle device satisfying a preset condition.

18. The method of claim 17, wherein:
the destination reception geographical location is represented by a sub-region identifier;
receiving the physical layer data based on the control information when the destination reception geographical location and the geographical location of the second Internet-of-vehicle device satisfies the preset condition further comprises:
receiving the physical layer data based on the control information when determining that the geographical location of the second Internet-of-vehicle device belongs to a sub region corresponding to the sub-region identifier based on a mapping relation.

19. The method of claim 17, wherein:
the destination reception geographical location is represented by a sub-region identifier and a coverage radius;
receiving the physical layer data based on the control information when the destination reception geographical location and the geographical location of the second Internet-of-vehicle device satisfies the preset condition further comprises:
determining a coverage region based on a central point and the coverage radius, where the central point is a point in a sub region identified by the sub-region identifier; and
receiving the physical layer data based on the control information when determining that the geographical location of the second Internet-of-vehicle device belongs to the coverage region based on a mapping relation.

20. The method of claim 19, wherein the sub-region identifier is further configured to identify:
a first sub region obtained by dividing the Earth's surface, and the first sub region is obtained by using a grid division method or a hexagonal division method, or
a third sub region obtained by administrative division, and the third sub region is obtained by using a country division method, a city division method, or a minimum administrative jurisdiction division method.

21. The method of claim 17, wherein, sub-region identifiers corresponding to at least two sub regions are same, and a distance between the at least two sub regions with the same sub-region identifier is greater than a threshold.

22. An Internet-of-vehicle device, comprising:
a processor;
a transceiver connected to the processor; and
a memory that is configured to store instructions executable by the processor,
wherein the processor is configured to load and execute the instructions to perform the method of claim 1.

* * * * *